US005884309A

United States Patent [19]
Vanechanos, Jr.

[11] Patent Number: 5,884,309
[45] Date of Patent: *Mar. 16, 1999

[54] ORDER ENTRY SYSTEM FOR INTERNET

[75] Inventor: Steven L. Vanechanos, Jr., West Orange, N.J.

[73] Assignee: Dynamic Web Transaction Systems, Inc., Fairfield, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 568,277

[22] Filed: Dec. 6, 1995

[51] Int. Cl.$^6$ ................................................. G06F 17/30
[52] U.S. Cl. ........................... 707/10; 707/531; 707/104; 707/100; 707/102; 707/4; 707/2; 395/200.76; 706/50
[58] Field of Search ............................. 395/610, 187.01, 395/200.76; 707/10, 513, 2, 100, 104, 4, 102; 706/50

[56] References Cited

U.S. PATENT DOCUMENTS

| | | | |
|---|---|---|---|
| 5,572,643 | 11/1996 | Judson | 395/793 |
| 5,712,979 | 1/1998 | Graber et al. | 395/200.11 |
| 5,717,860 | 2/1998 | Graber et al. | 395/200 |

OTHER PUBLICATIONS

Thomas et al. "NCSA's World Wide Web Server: Design and Performnace" Computer Magazine vol. 28, Nov. 1995.
Henning Schulzrinne " World Wide Web" IEEE pp. 10–17, Mar. 1996.
"Basic HTTP as defined in 1992" IEEE, Jan. 1992.
Teresa Lau "Building a Hypermedia Information System on the Internet" IEEE pp. 192–197, Feb. 1994.
Gee et al. "Novel approaches to automating the gathering of intelligence from the online community through the Internet" Online Information, pp. 11–21, Jan. 1994.
NCSTRL "Networked Computer Science Technical Reports Library", Nov. 28, 1995.
"Language Related Web Pages", Mar. 1989.
Lee et al. "Hypertext Markup Language—2.0", Nov. 1995.
James P H Coleman "An Investigation into Integrating Hypertext and Messagers" IEEE, Jun. 1995.
Gee et al, "Novel approaches to automating the gathering of intelligence from the online community through the internet", online information 94 precedings, pp. 501–511, Jan. 1994.
Mark et al, "Netscape 2.0", pp. 197–211, Jan. 95.
Gee et al, "Novel approaches to automating the gathering of intelligence from the online community through the internet", online information 94 precedings, pp. 501–511, Jan. 1994.
Mark et al, "Netscape 2.0", pp. 197–211, Jan. 1995.
"Using the world wide", Pub by Que Corp., Indianapolis, IN, pp. 59–109, Jan. 1994.
Multimedia at work commerce on the internet, IEEE Multimedia, Pub by Thomas D.C. Little, Dept. Elec., Computer and Sys. Engr, Boston Univ., pp. 74–78, Jan. 1994.
Frood, John Evan "Web vs. Other Media Outlets," Interactive Age, n216, p. 5, Jun. 1995.

(List continued on next page.)

*Primary Examiner*—Thomas G. Black
*Assistant Examiner*—Jean M. Corrielus
*Attorney, Agent, or Firm*—Brown, Martin, Haller & McClain

[57] ABSTRACT

A merchandising system and method in which Internet Web server software includes a parameter-driven search engine written in UNIX command language as a shell script that searches ASCII database files and generates HTML documents reflecting the search results. The search engine prevents multiple users from simultaneously attempting to write to a file. A common gateway interface is provided that facilitates access to multiple application programs, such as the merchandising system.

27 Claims, 14 Drawing Sheets

Microfiche Appendix Included
(1 Microfiche, 79 Pages)

OTHER PUBLICATIONS

Press Release, "Streams Readies Release of Breakthrough Internet Media Planing and assessment," Chicago, USA, retrieved from internet http://streams.com/press_release-.html, pp. 1–2, Aug. 1995.

W3 Organization, "HTTP Request fields," retrieved from internet, http://www.w3.org/pub/www/protocols/HTTP/HTRQ_Headers.html, pp. 1–5, May 1994.

Heylighen F., "World–Wide Web: a distributed hypermedia paradigm for global networking," Proceedings, SHARE Europe Spring Conference, pp. 355–368, Apr. 1994.

Moore, Steve "Internet Security Split: Let the Browser Beware," Abstract, computerworld, v29,n.35, p59(2), Aug. 1995.

Brody H., "<Internet@crossroads.$$$>," Technology Review, vol. 98 ISS.4, pp. 2431, May 1995.

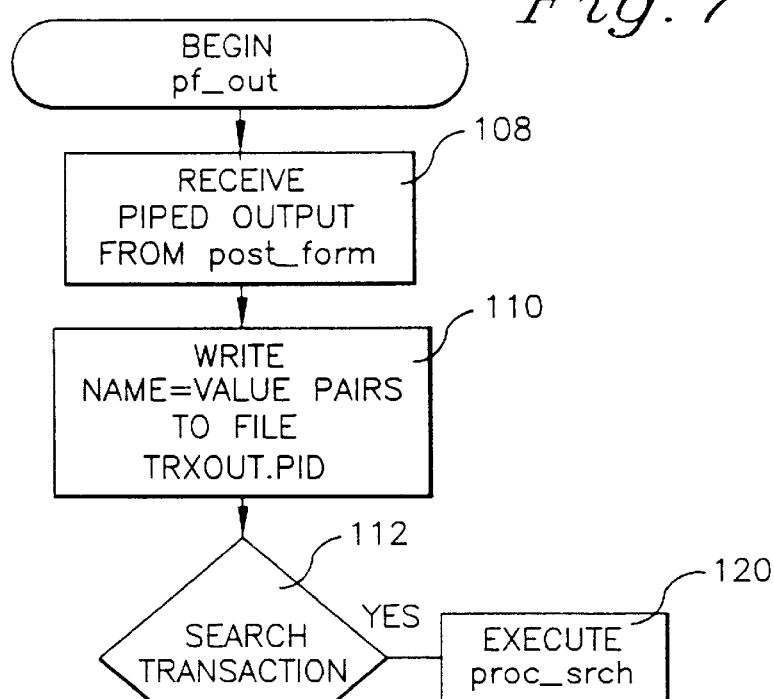
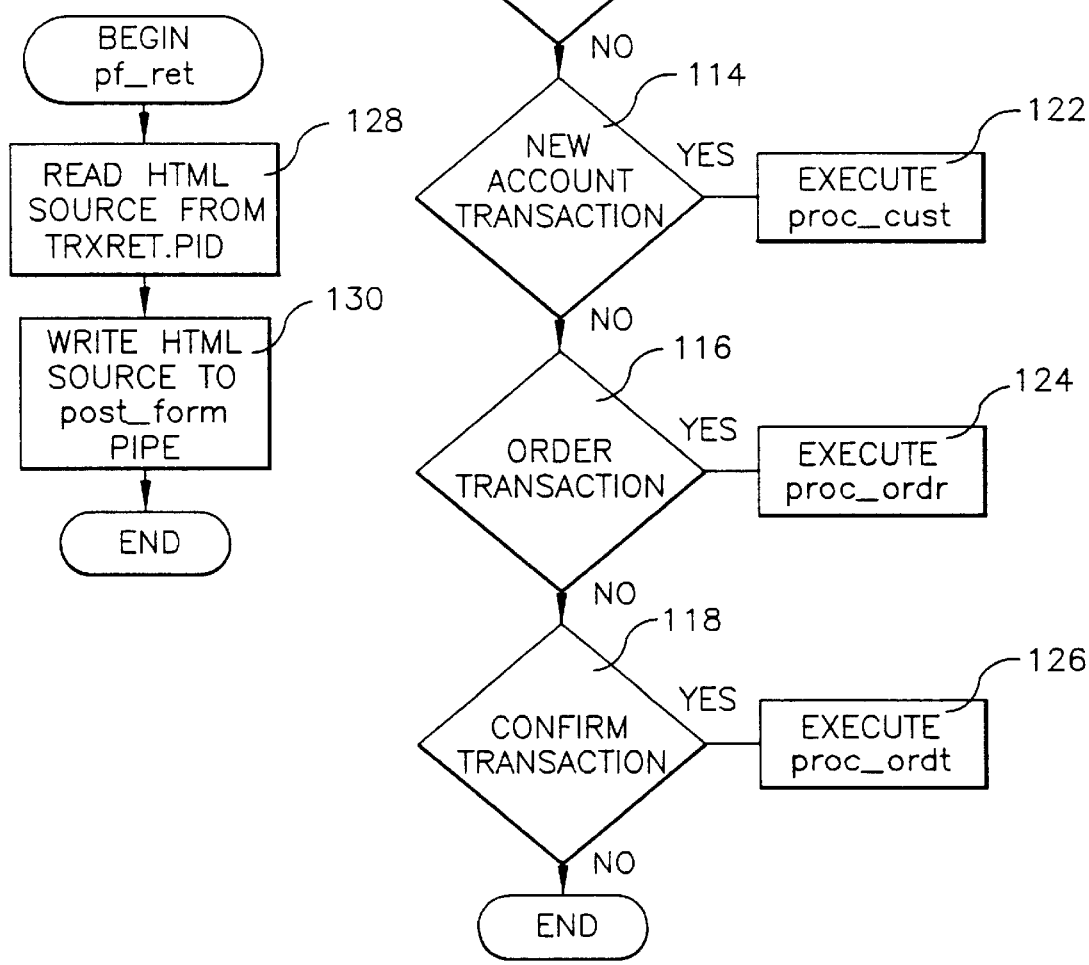
Fig. 7
Fig. 8

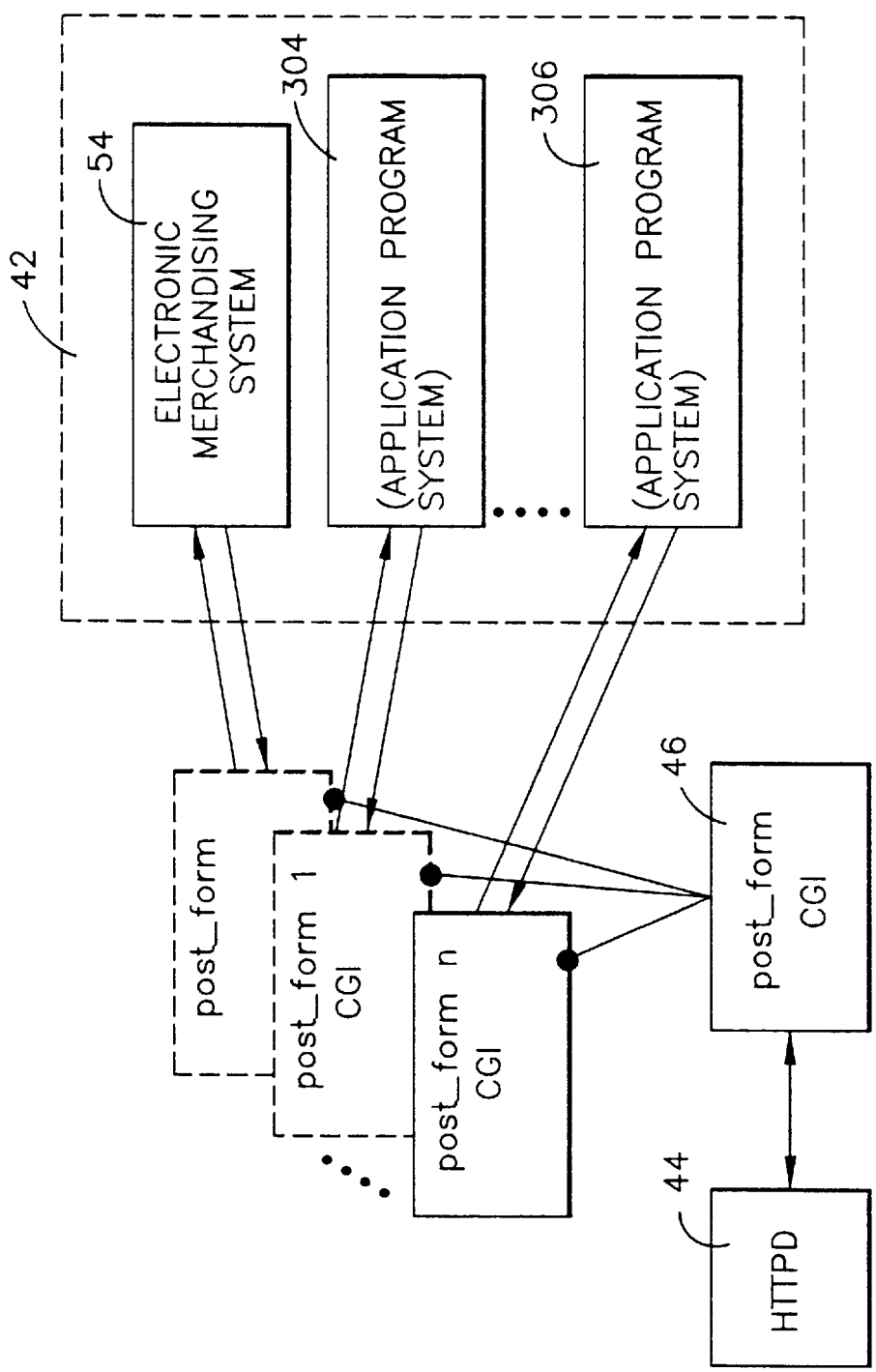

5,884,309

ORDER ENTRY SYSTEM FOR INTERNET

A Microfiche Appendix consisting of one microfiche, 79 frames, is included in this disclosure. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates generally to computer networks and client-server software applications and, more specifically, to systems for dynamically generating hypertext forms and receiving and processing such forms containing information filled in by a remote user.

2. Description of the Related Art

A distributed hypermedia computer system may be referred to as a "web." The World Wide Web (hereinafter "the Web" (capitalized)) is a web that uses the Internet to facilitate global hypermedia communication using specified protocols. One such protocol is the Hypertext Transfer Protocol (HTTP), which facilitates communication of hypertext. Hypertext is the combination of information and links to other information. In the context of the Web, hypertext is defined by the Hypertext Mark-up Language (HTML). The links or hyperlinks in a HTML document reference the locations of resources on the Web, such as other HTML documents. The term "hypertext," rather than "hypermedia," persists despite the fact that the information may comprise images, video and sound as well as text.

The Web is a client-server system. The HTML documents are stored on Web server computers, typically in a hierarchical fashion with the root document being referred to as the home page. The client specifies a HTML document or other resource on the server by transmitting a Uniform Resource Locator (URL), which specifies the protocol to use, e.g., HTTP, the path to the server directory in which the resource is located, and filename of the resource. An HTTP daemon (HTTPD) is a program running on the server that handles these requests. Users retrieve the documents via client computers. The software running on the user's client computer that enables the user to view HTML documents on the computer's video monitor and enter selections using the computer's keyboard and mouse is known as a browser. The browser typically includes a window in which the user may type a URL. The browser also typically includes button labeled "Back" that instructs the browser to request the document previously displayed. It may also include a "Forward" button that instructs the browser to re-request a previously displayed document that has been backed over using the "Back" button.

A user may cause a URL to be transmitted by typing it in the designated window on the browser or by maneuvering the cursor to a position on the displayed document that corresponds to a hyperlink to a resource and actuating the mouse button. The latter method is commonly referred to simply as "clicking on the hot-spot" or "clicking on the hyperlink." When the browser transmits a URL to the HTTPD, the HTTPD accesses the specified resource. If that resource is an HTML document, the HTTPD retrieves the document and transmits it back to the browser. If the resource is a program, the HTTPD executes it. In a Web server running the UNIX operating system and either a NCSA or CERN HTTPD, the HTTPD assumes the resource is a program and attempts to execute it if the resource is located in the "cgi-bin" directory. A resource that is an executable program is generally known as a common gateway interface (CGI). On UNIX servers, CGIs are typically UNIX shell scripts or Perl scripts. CGIs written in high level programming languages, such as C or C++, are also known, and are generally preferred over scripts for writing complex CGIs. The CGI may accept input data that the HTTPD received from the browser. The HTTPD provides this input data to the CGI. The CGI may similarly pass output data to the HTTPD for transmission back to the browser, typically in the form of HTML.

The CGI may function as a stand-alone application program, but as its name implies more commonly functions as a gateway to other application programs. If the Web server has multiple application programs, one of the parameters that the CGI receives from the HTTPD identifies the application that the CGI is to select. If an application program is added or removed from the server, the CGI must be revised. If an application program is moved to another directory or the directory hierarchy is revised, the CGI must also be revised. Moreover, because each application program may expect data differing in type, number, range, etc., from other application programs, the CGI may include a specialized interface for each application program and unwieldy branching structures. If the application is revised to accept different or additional data, the CGI must also be revised. These maintainability problems increase with an increase in the number of application programs that use the CGI.

A HTML document may be a form that a user may enter information into and submit back to the server (or to a different server). HTML provides means for creating buttons that submit the form, boxes into which a user may type free-form text, boxes having options among which a user may select, boxes in which a user can toggle a checkmark on and off by clicking on it, and other types of input boxes. The browser associates the information ("value") that a user enters with a variable name ("name") specified in the HTML code. The CGI receives the filled-in HTML form from the HTTPD and parses it into "name=value" pairs. An application program running on a server may obtain its input information from the CGI in the form of such name=value pairs.

Web server application software is known that enables a user to shop for and order merchandise. Such systems are sometimes referred to as electronic merchandising systems or virtual storefronts. Systems that enable a user to choose among several retailers' goods are sometimes referred to as electronic malls. An electronic retailer's or electronic mall operator's Web server provides HTML forms that include images and descriptions of merchandise. The user may search for an item by entering a key word search query in a box on a form. When a user selects an item, the server may provide a linked form that describes that item in further detail. The user may enter ordering information into boxes on the form, such as the type and quantity of the item desired. The information entered by the user is transmitted to the server. The user may select multiple items in this manner and then enter a credit card number to pay for the purchases. The retailer processes the transaction and ships the order to the customer.

In the above-described merchandising system, the Web server enters the order information into a database. Similarly, the server merchandising application program may retrieve the product information from a database.

Retailers typically maintain their existing customer and product information using commercially available database management software. Many companies produce database application software, but the formats in which the various companies' database management software stores the data are not compatible. In other words, data may need to be reformatted in order to transfer the data from one database management program to another. Nevertheless, server merchandising software is typically oriented toward a particular company's database management program and does not operate with database management programs produced by other companies. Consequently, if a retailer desires to implement a merchandising system on the Web, the retailer may need to convert its existing customer and product database information to a format that is compatible with the server merchandising software.

Furthermore, the server merchandising software is an application program. Although merchandising software written in PERL, a script-like, interpreted language, is known, merchandising software is more typically written in a high-level language and compiled into object code compatible with a particular server platform, i.e., type of computer. Such programs are not portable from one server platform to another. Not only must a software producer compile the merchandising software for each server platform on which it is intended to run, but the software producer must re-compile the software for each server platform each time the software producer revises the software.

Searching for items that the user is interested in purchasing is inefficient in prior merchandising systems. Database management programs use index searching to facilitate rapid searching of large amounts of data. The creator of the database may instruct the program to use specified fields in the database as indexed or key fields. The program locates all terms in the database that appear in the indexed fields and stores them in an index table. Each entry in the index table includes a term and corresponding pointer to the location in the database where the term is found. If a user initiates a search for a term that is present in the index table, the program can locate the instances of that term in the database with exceptional speed. Users who are familiar with the particular database they are searching will generally know which fields are indexed and will know the format of the data in those fields. For example, a user of a database containing the inventory of a bookstore may know that users can search for the names of authors of books and that a user who wishes to do so should enter the author's last name first. A user having such knowledge will therefore be able to search efficiently. Users of electronic merchandising systems, however, are generally end-consumers who have no knowledge of a merchant's database. If, as is very likely, such a user initiates a search for a term that is not present in the index table, the program must sequentially search through all records in the database. Sequential records are typically linked by pointers. Using pointers in this manner is very demanding on server resources, resulting not only in an exceptionally slow search, but also creating a bottleneck for other processes that the server may be executing.

UNIX, a well-known operating system, is the most common operating system for Web servers. UNIX conceptually comprises two elements: a shell and a UNIX kernel. The shell is a program that provides an interface between the user and the kernel. The shell interprets commands the user enters and returns the results of commands to the output device. UNIX includes a rich set of file handling and searching commands. A shell script is a sequence of UNIX commands that form a program that UNIX can execute. Shell scripts are convenient to use, but they run much slower than a functionally equivalent compiled program. UNIX is also a multitasking system, i.e., users can run more than one program simultaneously.

It would be desirable to provide a highly maintainable CGI that efficiently interfaces with multiple web server application programs. It would further be desirable to provide a search engine for a web server application programs, such as electronic merchandising systems, that uses a universally accepted data format, that is highly portable, and that can be flexibly searched. These problems and deficiencies are clearly felt in the art and are solved by the present invention in the manner described below.

SUMMARY OF THE INVENTION

In one aspect, the present invention comprises a web server system and method, in which the software includes a parameter-driven search engine written in UNIX command language as a shell script that searches ASCII data files for specified data patterns. The search engine may receive the data patterns from a HTML form in any order and may determine the database fields against which to compare the patterns by comparing the HTML variable names against names in a predetermined key or field tag string. In addition, unlike the search methodology used in conventional database management programs, the search engine may use UNIX shell commands such as "awk" enable the search engine to flexibly search for text strings anywhere in the ASCII file. Furthermore, because nearly every database management program can convert the data from its native format to ASCII, the search engine is not tied to a particular database management program. The search engine may generate HTML documents reflecting the search results.

The web server system may also include software that prevents multiple users from simultaneously adding information to a file. The software uses the UNIX link command "In -s" to link the file to another file. If another process attempts to link a file that is already linked, the process receives an error message. Conventional database management systems address the concurrency management problem by including an agent or daemon program that constantly monitors and updates a lock table. The novel use of the UNIX link command in the present invention avoids the use of agents, lock tables and other complex concurrency management methods.

In another aspect, the present invention comprises a web server system and method, in which the software includes a single CGI program for HTML Forms transactions that can be referenced by more than one name or alias and that interfaces with application programs called by file names corresponding to these aliases. The CGI may be associated with each of its aliases by the UNIX link command "In". The Forms transaction transmitted by the browser to the HTTPD includes a URL that specifies one of the aliases. The CGI then calls one of the application programs. The CGI specifies the application program by using the alias with which the CGI was itself called by the HTTPD. (Note that a program running under UNIX can obtain its own file name.) The CGI parses the HTML form into name=value pairs and writes it to an output pipe from which an application program can receive it as standard input.

The CGI can be very small and efficient because it passes the name=value information through essentially unchanged. Unlike a conventional CGI, it does not transform the information in order to interface with the input format of the application program. Because the CGI is independent of application program input/output format, it does not need to be revised if new application programs are added or existing ones revised.

In yet another aspect, the present invention comprises an order entry system or electronic merchandising system that includes the above-described search engine and CGI.

The foregoing, together with other features and advantages of the present invention, will become more apparent when referring to the following specification, claims, and accompanying drawings.

BRIEF DESCRIPTION OF THE DRAWINGS

For a more complete understanding of the present invention, reference is now made to the following detailed description of the embodiments illustrated in the accompanying drawings, wherein:

FIG. 7 is a flow diagram of the output pipe software module "pf_out";

FIG. 8 is a flow diagram of the return pipe software module "pf_ret";

FIG. 17 is a flow diagram of a system for providing a common gateway interface to a plurality of application programs.

DESCRIPTION OF PREFERRED EMBODIMENTS

Figure 1:
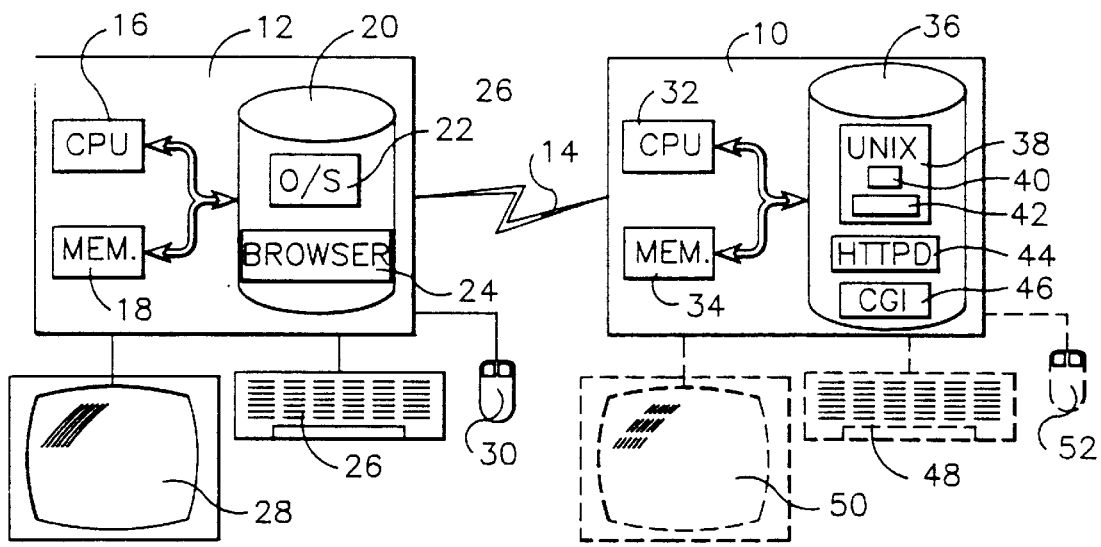
FIG. 1 is a block diagram of the system of the present invention, showing the client and server computers.

As illustrated in FIG. 1, a web server 10 is connected to a client computer 12 via a network 14, which is preferably a portion of the Internet. Client computer 12 includes a suitable processor 16, a memory 18, and a hard disk 20. A suitable operating system 22 and a web browser 24 are stored on disk 20. Client computer 12 also includes a keyboard 26, a monitor 28 and a mouse 30. The interfaces between network 14, keyboard 26, monitor 28, mouse 30 and the remaining elements of client computer 12 are well-known and therefore not shown. As those of skill in the art will appreciate, client computer 12 may be any type of general purpose computer, such as a microcomputer or workstation. For purposes of describing the present invention, the most notable feature of client computer 12 is that browser 24 allows it to perform hypertext transactions in accordance with the Hypertext Transfer Protocol (HTTP) with web server 10 and any other web servers that may be accessible via network 14. Browser 24 may be any suitable Web browser software, such as the widely popular, commercially available NETSCAPE NAVIGATOR. The manner in which such software operates is well-known and is therefore described herein only to the extent that it specifically relates to the present invention. Nevertheless, the operation of client computer 12 may be briefly characterized as requesting hypertext documents from server 10 in response to commands that a user enters using keyboard 26 and mouse 30, and displaying the received hypertext documents on monitor 28. Hypertext is defined by the Hypertext Markup Language (HTML). Web server 10 transmits a hypertext or HTML document to client computer 12 in the form of a sequence of HTML commands or tags and any associated image files.

Web server 10 comprises a suitable processor 32, a memory 34, and a hard disk 36. A UNIX operating system 38 is stored on disk 36 and includes a UNIX kernel 40 and a UNIX shell 42. Web server software, which is also stored on disk 36, includes a HTTP daemon (HTTPD) 44, which is a commercially available product, and a common gateway interface (CGI) 46 are also stored on disk 36. For maintenance and programming purposes, web server 10 may also include a keyboard 48, a monitor 50 and a mouse 52. Although web server 10 may be any suitable type of commercially available computer platform, it should be capable of running the UNIX operating system and communicating via network 14.

Figure 2:
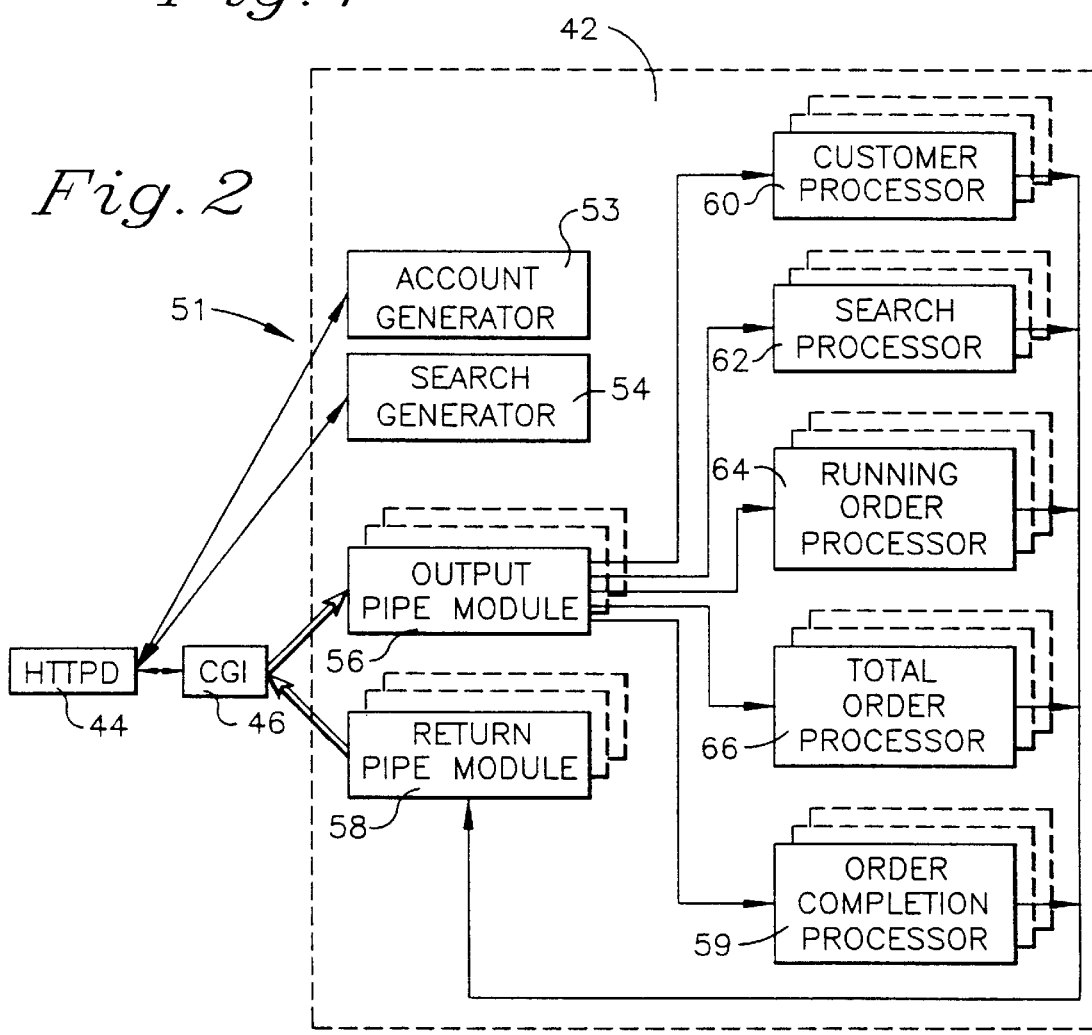
FIG. 2 illustrates the server software modules and the interfaces between them.

The web server software, generally designated 25, is illustrated in FIG. 2. Web server software 25 includes a number of UNIX shell script software modules, the code listings for which are provided in the Appendix hereto: account generator module 53 (filename "gen-acct" in the code listing in the Appendix); search generator module 54 (filename "gen-srch" in the code listing in the Appendix); output pipe module 56 (filename "pf_out" in the code listing in the Appendix); return pipe module 58 (filename "pf_ret" in the code listing in the Appendix); customer processor module 60 (filename "proc_cust" in the code listing in the Appendix); search processor module 62 (filename "proc_srch" in the code listing in the Appendix); running order processor module 64 (filename "proc_ordr" in the code listing in the Appendix); total order processing module 66 (filename "proc_ordt" in the code listing in the Appendix); and order completion processing module 59 (filename "proc_ordc" in the code listing in the Appendix). Although only one of each module physically resides on disk 36, shadow copies of modules 56–66 are shown in dashed line to emphasize that, because UNIX is a multiprocessing environment, several processes may execute simultaneously. These modules together are included in an electronic merchandising system that a user can access via client computer 12, as described in detail below.

A. Electronic Merchandising System

Figure 3A:
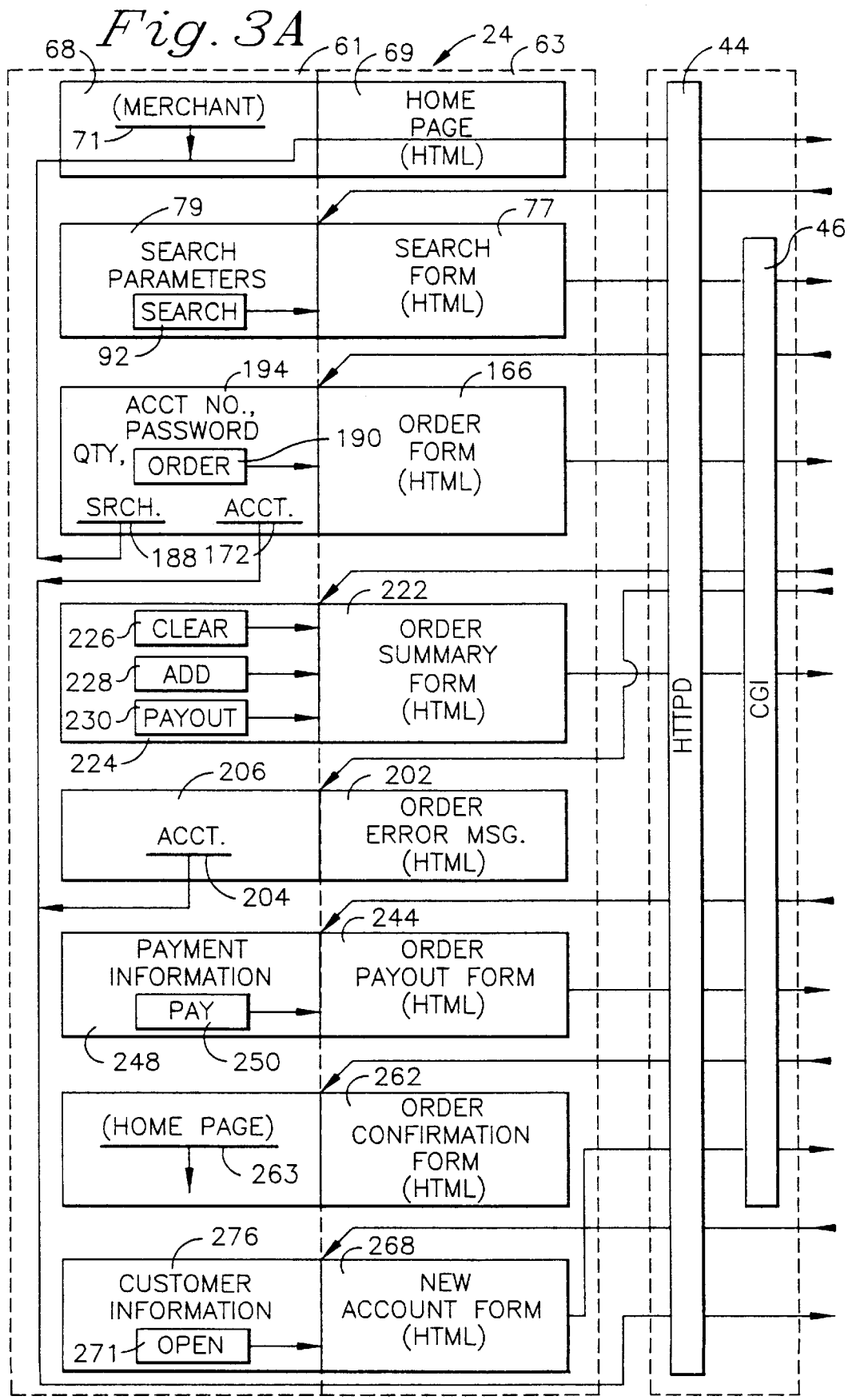
FIG. 3 illustrates the flow of information between the client and server computers.
Figure 3B:
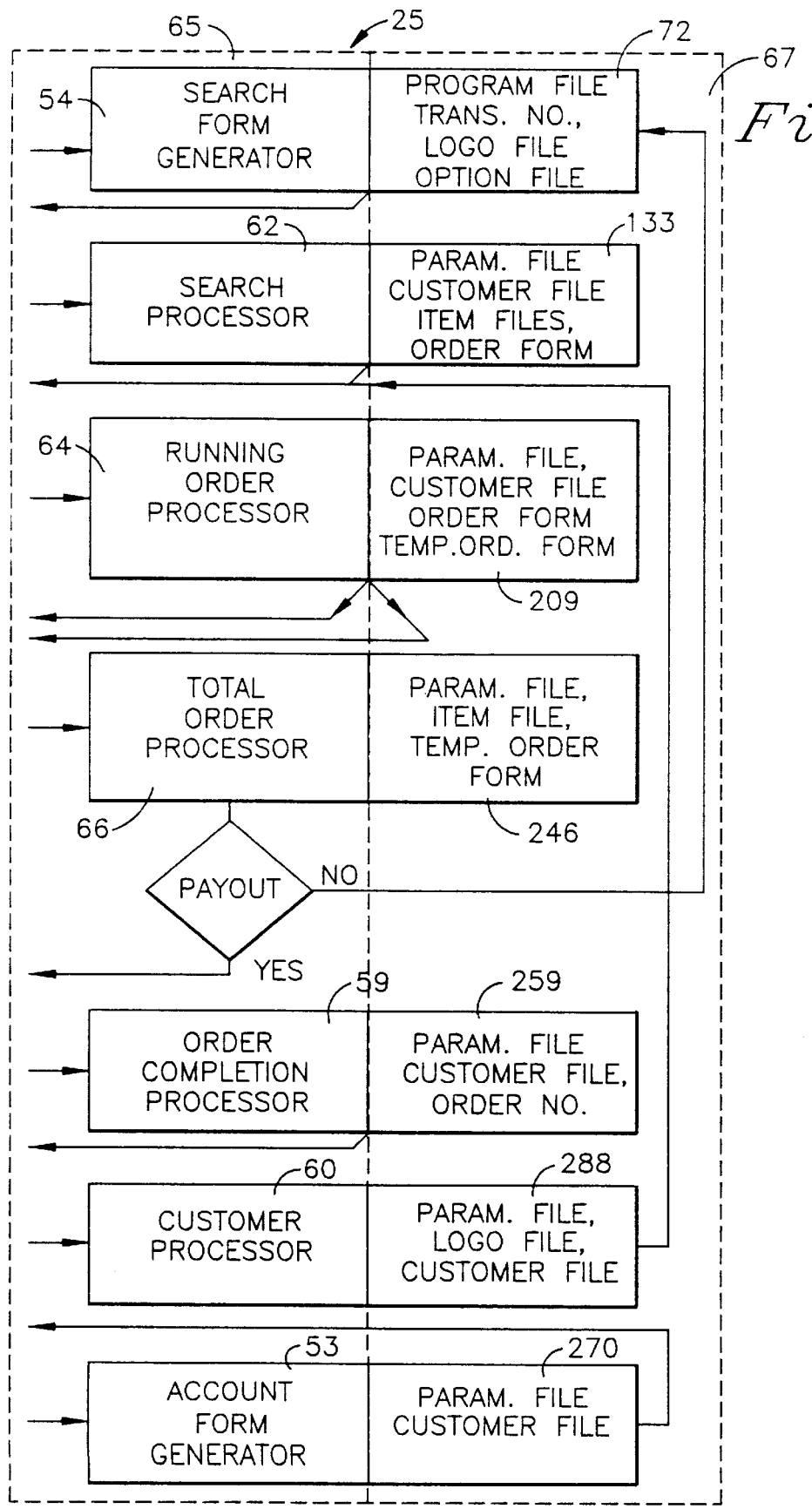

FIG. 3 illustrates the client-server transactions that occur when the electronic merchandising system is used. Client software 24 is shown on the left, and web server software 25 on the right. To illustrate the client-server nature of the transactions, client software 24 is illustrated as comprising client input 61 and server-generated HTML documents 63. Similarly, web server software 25 is illustrated as comprising processes 65 and data files 67. Nevertheless, as those of skill in the art will appreciate, these divisions are conceptual rather than physical. To use the electronic merchandising system, the user provides client merchant input 68 that causes client computer 12 (FIG. 1) to transmit a Uniform Resource Locator (URL) pointing to search generator module 54. Client merchant input 68 may consist of clicking on a merchant hyperlink 71 displayed on the electronic mall operator's home page 69. A user may choose from among several merchants whose products or services are available via the electronic mall by clicking on their corresponding hyperlinks, which would typically be indicated on home page 69 by the merchant's name or logo. Nevertheless, as those of skill in the art will appreciate, a user may cause this URL to be transmitted in any other suitable manner, such as by typing it into browser 24 (FIG. 1) or by clicking on a hyperlink in any other HTML document, regardless of its origin, that is currently displayed by browser 24. As described below, search generator module 54 generates a search form that is unique to a particular merchant. The URL pointing to search generator module 54 should therefore include the term "gen-srch?XXX", where "XXX" is a three-letter term identifying the merchant that is passed to search generator module 54 as an argument.

1. Generating a Search Form

Figures 4, 5:
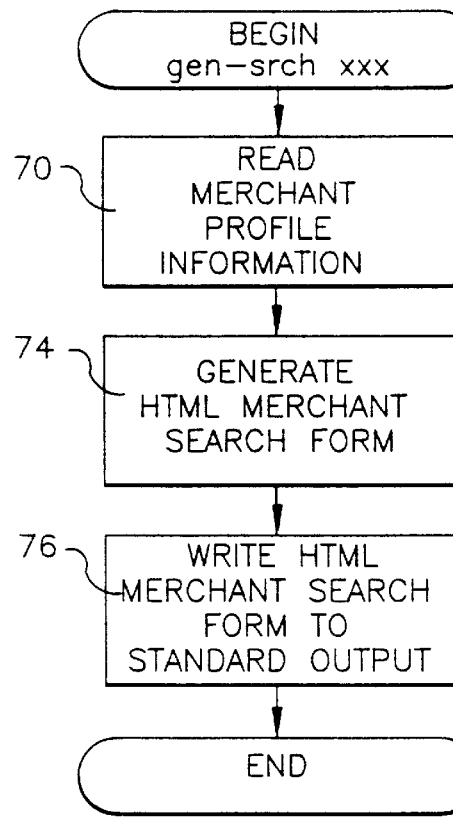
FIG. 4 is a flow diagram of the search form generator software module "gen-srch"
FIG. 5 illustrates a typical search form.

FIG. 4 illustrates the process by which search generator module 54 generates a HTML form for transmittal to client computer 12. A UNIX shell script listing of search generator module 54 (filename "gen-srch") is provided in the Appendix. At step 70 search generator module 54 reads profile information describing the merchant and the merchant's goods or services from search generator data files 72 (FIG. 3). Search generator data files 72 may include: a parameter file containing various environment variables, pathnames, and other information generally required by processor modules 59–66; a transaction number file containing a list of transaction numbers; a file containing an image of the merchant's logo; and an option file containing a list of the names of the fields in the merchant's item database that are searchable. Search generator module 54 calculates a unique transaction number by incrementing a running count of the total number of times search generator module 54 has been accessed, and appends the new transaction number to the transaction number file. At step 74, and as described in further detail below, search generator module 54 dynamically generates HTML code that represents a search form. Because search generator module 54 is a UNIX shell script, it may generate this code at step 76 by writing ASCII text to standard output. HTTPD 44 transmits the HTML code to client computer 12 (FIG. 1).

FIG. 5 illustrates the resulting search form 77 that browser 24 may display on the user's monitor 28. In the illustrated example, search form 77 is that of a bookseller. In addition to the merchant's logo 78, which may be in any suitable format recognized by HTML, search form 77 preferably includes one or more text input boxes, check boxes, option boxes and number input boxes with which the user can input search parameters. In the present example, search form 77 includes an "Item #" text box 80, a "Topic" option box 82, a "Description" query box 84, and a "Bestsellers" check box 85. These input boxes are determined by the information in the option file and may be unique to each merchant's search form. In addition to search parameters that may be unique to each merchant, search generator 54 includes in all search forms a "Sort by" option box 86, a "Search on UPPERcase only" check box 88, and a "Limit search to ___ items" option box 90. Text boxes allow the user to enter free-form text. Option boxes 82, 86 and 90 allow the user to select one of a number of predetermined responses. For example, "Topic" option box 84 may provide responses labeled "Arts", "Business", "Science" and "History". "Sort by" option box 86 may provide responses labeled "Topic" and "Description". Check box 85 allows the user to provide a yes or no answer. In the present example, the user may click on check box 85 to indicate he wishes to limit the search to books that are "bestsellers." Checking "Search on UPPER-case only" check box 88 causes search processor module 62 to be case-insensitive in its search if the user enters search parameters in upper case only. In addition, "Limit search to ___ items selected" option box 90 causes search processor module 62 to stop searching when the selected number of items meeting search parameters 79 are found. As those of skill in the art will appreciate, text input boxes, check boxes and option boxes are well-understood HTML features, and the HTML code for creating them is thus not described herein.

As noted above, search generator data files 72 include a parameter file. The parameter file contains a statement having the following format that search generator 54 uses to produce HTML text input boxes and option boxes:

SRCHS = " <field_tag> = <field_num> | <field_tag> = <field_num> |

<field_tag> = <field_num> | ... "

Search generator 54 parses this statement to retrieve the field tags (represented herein by "<field_tag>"). Search generator 54 appends the extension ".LST" to each field tag and determines whether a file having the filename "<field_tag>.LST" exists in search generator data files 72. Such a file exists only if an option box should be created on search form 77 for searching the field designated by that field tag. If such a file exists, search generator 54 generates the proper HTML code for displaying an option box labeled with the selectable options listed in the file "<field_tag>.LST" (plus the option "Any", which causes search processor module 62 to search all of the other listed options). For example, a "<field_tag>.LST" file may include the labels "Arts", "Business", "Science" and "History". If such a file does not exist, search generator 54 generates the proper HTML code for displaying a text input box labeled with the field tag.

Designating the field tags in the HTML code itself rather than by programming field tag selection into search processor module 62 (perhaps using a complex branching arrangement) allows the form to be changed or tailored to suit a particular merchant without altering any of processing modules 59–66. For example, a bookseller may designate the first searchable field of the database by the tag "Author," while a seller of music may designate the first searchable field of the database by the tag "Artist." The book merchant's parameter file may thus include the following assignment of field tags to database field numbers:

SRCHS="Item#=1|Topic=2|Description=3"

Similarly, the music merchant's field tag file may include the following assignment of tags to database field numbers:

SRCHS="Artist=1|Album=2|Category=3|"

The parameter file also includes a statement having the following format that search generator 54 uses to produce HTML check boxes:

CHKBOXS="<label>|<label>|<label> ... "

Search generator 54 parses the statement to retrieve the labels. Search generator 54 generates the proper HTML code for displaying checkboxes labeled with these labels. (It should be noted that the syntax of these statements, by which variables are assigned values, is not relevant to search generator 54, but rather is used to pass the values to search processor module 62, which uses them as search strings for searching the merchant's database. This process is described below in further detail with respect to FIG. 9A–B and search processor module 62.). In the example above, the bookseller's parameter file may thus include the statement:

*CHKBOXS="Bestseller"*

In response to this statement, search generator 54 would generate HTML code for displaying a checkbox labeled "Bestseller", as in the exemplary search form 77.

Search generator 54 also generates the proper HTML code for including in search form 77 a number of HTML hidden variables that specify a user number (name "memno" in the code listing in the Appendix), a password (name "userpass"), a transaction number (name "trxno" in the code listing in the Appendix), a function selector (name "func" in the code listing in the Appendix), the three-letter merchant identifier (e.g., "ban" for the bookseller), and a filename and pathname for instructing search processor module 62 where to store the resulting order form that it will produce (e.g., "ordfrm.4000" in a subdirectory called "ban" for the bookseller's order form relating to the 4000th transaction). Finally, search generator 54 generates the proper HTML code to provide search form 77 with a "Search" submit button 92 that submits the form via a hyperlink to search processor module 62 (See FIGS. 2 and 3). Search generator module 54 may thus generate the following exemplary HTML code fragment in search form 77:

```
<FORM METHOD = "POST" ACTION = "/dwos_bin/post-form">
<INPUT TYPE = hidden NAME = memno VALUE = "">
<INPUT TYPE = hidden NAME = userpass VALUE = "">
<INPUT TYPE = hidden NAME = trxno VALUE = 4000>
<INPUT TYPE = hidden NAME = func VALUE = search>
<INPUT TYPE = hidden NAME = mmcust VALUE = ban>
<INPUT TYPE = hidden NAME = ordfrm VALUE =
                  /home/ncsa/httpd_1.3/data/ban/ordfrm.4000>
. . .
<INPUT type = submit VALUE = Search>
```

When the user clicks on "Search" submit button 92 of search form 77, browser 24 (FIG. 1) submits the form by transmitting a URL that references CGI 46 (filename "post_form" in the code listing in the Appendix). The search parameters and hidden variables obtained from search form 77 are transmitted along with this URL.

Returning to FIG. 3, search processor module 62 receives the filled-in search form 77 via HTTPD 44 and CGI 46. CGI 46 is the gateway not only to search processor module 62, but also to customer processor module 60, running order processor module 64, and total order processor module 66, as illustrated in FIG. 2. As described below, the program module to which the filled-in search form 77 is routed depends on the value of the "func" hidden variable.

2. Routing HTML Forms via the Common Gateway Interface

Figure 6:
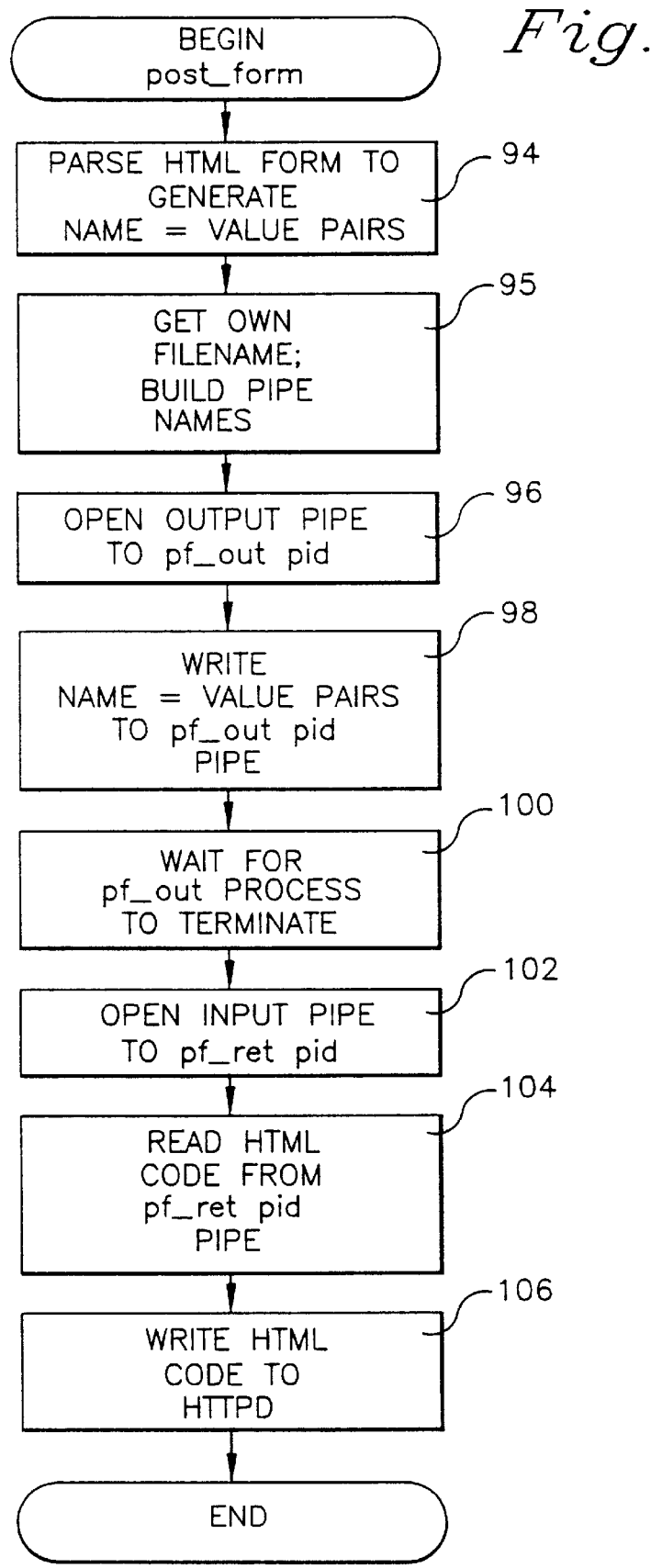
FIG. 6 is a flow diagram of the CGI software module "post_form"; is a flow diagram of the return pipe software module "pf_ret"

FIG. 6 illustrates the process by which CGI 46 receives the filled-in form 77, waits for it to be processed, and returns the resulting HTML code to client computer 12. A listing of the "C" language code of CGI 46 (filename "post-form") is provided in the Appendix. Those of skill in the art will appreciate that, unlike a conventional CGI for a form processing system, CGI 46 has relatively few lines of code. It does not perform any significant processing itself. Rather, it merely coordinates communication between HTTPD 44 and modules 59—66. At step 94 CGI 46 parses the HTML code received from HTTPD 44 that represents the form into name=value pairs, each separated by a UNIX pipe character "|". At step 95, CGI obtains its 35 own filename and derives a pipe name from it. The purpose of step 95 is described below with respect to section B hereof, "Common Gateway Interface." A description of step 95 is not necessary to the understanding of the electronic merchandising system. At step 96 CGI 46 opens a pipe to output pipe module 56 (filename "pf_out PID" in the code listing in the Appendix), which is described below. At step 98 CGI 46 writes the name=value pairs to this pipe and, at step 100, waits for output pipe module 56 to terminate processing. By the time output pipe module 56 terminates processing, the resulting HTML code that CGI 46 is to return to client computer 12 will have been generated. At step 102 CGI 46 opens a pipe to return pipe module 58 (filename "pf_ret" in the code listing in the Appendix), which is described below. At step 104 CGI 46 reads the HTML code from return pipe module 58. At step 104 CGI 46 writes this HTML code to HTTPD 44. CGI 46 then terminates execution.

FIG. 7 illustrates the process by which output pipe module 56 receives the name=value pairs and passes processing to the appropriate one of processing modules 59–66. A UNIX shell script listing of output pipe module 56 (filename "pf_out" PID) is provided in the Appendix. At step 108 output pipe module 56 receives the piped name=value pairs from CGI 46. At step 110 output pipe module 56 writes the name=value pairs to a file named "TRXOUT.PID." The extension "PID" is the process ID that UNIX assigns to output pipe module 56 when it executes. Each time CGI 46 initiates execution of output pipe module 56, UNIX creates another process. Because several users may simultaneously access the electronic merchandising system, several such processes may be created. Each process can be referenced by its unique process ID. To emphasize this multiprocessing aspect, multiple processes of output pipe module 56 are shown in dashed line in FIG. 2. At steps 112, 114, 116 and 118, output pipe module 56 tests the "func" variable. If "func" has a value that indicates the next function to perform is a search, output pipe module 56 transfers execution to search processor module 62 at step 120. If "func" has a value that indicates the next function to perform is to open an account for a new customer, output pipe module 56 transfers execution to customer processor module 60 at step 122. If "func" has a value that indicates the next function to perform is to add selected items to the customer's running order, output pipe module 56 transfers execution to running order processor module 64 at step 124. If "func" has a value that indicates the next function to perform is to complete a customer's order, output pipe module 56 transfers execution to total order processing module 66 at step 126.

By the time CGI 46 opens an input pipe to return pipe module 58, as described above with respect to step 102 (FIG. 6), return pipe module 58 will have received from one of processor modules 59–66 the processed HTML information that defines the next form to be delivered to client computer 12. As illustrated in FIG. 8, at step 128 return pipe module 58 reads this HTML information from file "TRXRET.PID" and, at step 130, pipes the information to CGI 46. A UNIX shell script listing of return pipe module 58 (filename "pf_ret" PID) is provided in the Appendix. It should be noted that the process ID ("PID") of return pipe module 58 is the same as that of output pipe module 58 and that both PIDs are the same as that of CGI 46, because CGI 46 spawned the two pipe module processes. Another consequence of the manner in which these pipe module processes are initiated is that return pipe module 58 may pipe its output to CGI 46 by writing it to standard output ("stdout").

3. Processing the Completed Search Form

Figure 9A:
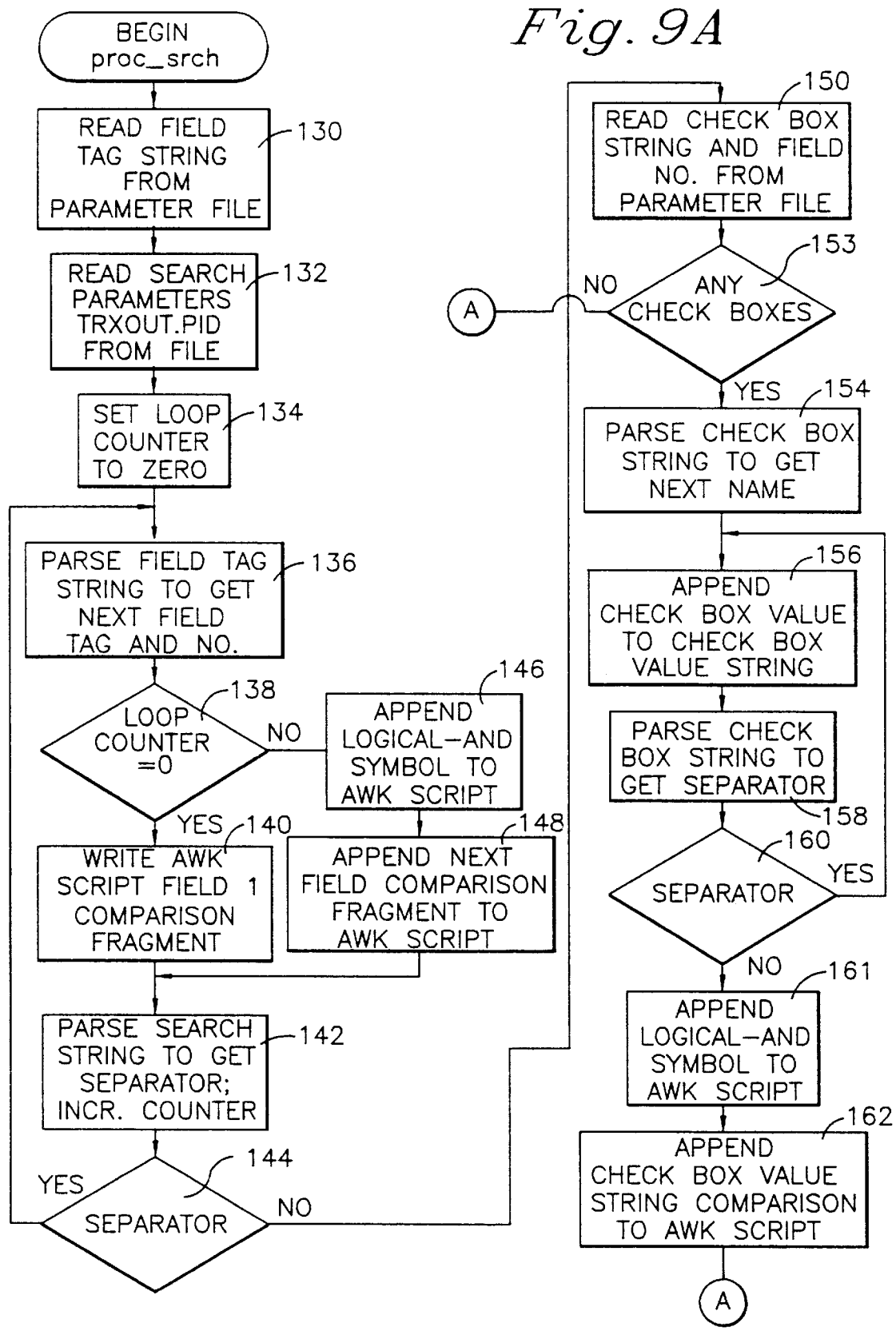
FIG. 9 is a flow diagram of the search processing software module "proc_srch"

FIG. 9A illustrates the process by which search processor module 62 receives the search parameters and searches an ASCII database file for items that meet the search parameters. A UNIX shell script listing of search processor module 62 (filename "proc_srch") is provided in the Appendix. At step 130 search processor module 62 reads the field tag string from a parameter file, which is included in search processor data files 133. (The field tag string is the value of the variable "SRCHS".) As noted above, each merchant may have a unique parameter file stored in a directory corresponding to that merchant. Search processor module 62 can determine the name of that directory because the directory name corresponds to the three-letter merchant identifier that search processor module 62 receives as a hidden variable (name "mmcust" in the HTML code listing in the Appendix). At step 132 search processor module 62 reads the search parameters and hidden variables from file "TRX-OUT.PID". The search parameters comprise the variable names and their values entered as client-provided search information 79 (FIG. 3), as described above. The search parameters thus include not only free-form text patterns that the user entered, but also checkbox values and other information provided by the form. Search processor module 62 uses the field tags to convert the name=value pairs to environment variables, i.e., UNIX shell variables. At step 134 search processor module 62 sets a loop counter to zero.

In the loop described below, search processor module 62 will extract the field tags and use them to construct an "awk" program or script. Search processor module 62 will then execute the "awk" script, which will search the merchant's item file. As those of skill in the art will appreciate, "awk" is a specialized programming language within the UNIX shell that enables the creation of small, efficient programs. The "awk" language has extensive file-handling and formatted printing features. It can recognize field separators in files and handle data read from files on a field-by-field basis. It also has extensive pattern-matching features and can handle regular expressions more efficiently than the UNIX "grep" command in certain instances. The code listing in the Appendix uses "new awk," a newer version of the "awk" language, and thus invokes the "awk" script using the command "nawk".

At step 136 search processor module 62 parses the filed tag string to extract the first field tag and its corresponding field number. In the bookseller example above, the first field tag is "Item#" and its corresponding field number is "1". Search processor module 62 extracts from the search parameters the variable name that is the same as the field tag and reads the value of that variable. This value may be a number, a word, or any other pattern of ASCII characters. In the example above, the value of the "Item#" variable would be a number that the user entered into text box 80 on search form 77. If, at step 138, the loop counter is zero, which indicates that this is the first iteration through the loop, search processor module 62 proceeds to step 140.

The "awk" script that will be generated consists of only one line. At step 140 search processor module 62 writes the initial fragment of the "awk" script to a file. This initial fragment has the format:

$1~/<pattern>/

As those of skill in the art will understand, this "awk" script will compare the specified search pattern with the contents of the first field ("$1") of the input file that would be specified when the script is executed. At step 142 search processor module 62 parses the search string to extract a separator character "|", if one exists, which would indicate that additional fields must be searched. Search processor module 62 also increments the loop counter. At step 144 search processor module 62 determines if a separator character exists and, if so, returns to step 136 and obtains the next search pattern and field number. When search processor module 62 reaches step 138, because the loop counter is greater than zero, it proceeds to step 146. At step 146 search processor module 62 appends the "awk" logical-AND symbol ("&&") to the script file. At step 148 search processor module 62 appends the next search parameter and field number to the "awk" script file, resulting in an "awk" script fragment having the format:

$1~/<pattern>/&&$2~/<pattern>/

When search processor module 62 reaches the end of the loop at step 144, i.e., no more field tags exist in the search string, it begins another loop to process the check boxes. At step 150 search processor module 62 reads the check box string from the parameter file. (The check box string is the value of the variable "CHKBOXS".) Search processor module 62 also reads a check box field number from the parameter file. The parameter file contains the statement "CHECKFLD=<field_num>", and the field number specified in this statement represents the field of the merchant's database that contains the check box data against which the user's check box inputs will be compared. At step 153 search processor module 62 determines whether there are any check boxes to process. If the value of "CHKBOXS" is null, there are no checkboxes, and search processor 62 proceeds to step 163, described below. If the value of "CHKBOXS" is not null, at step 154 search processor module 62 parses the check box string and extracts the first check box label or name. In the above example, there is only one check box, and it is labeled "Bestseller". At step 156 search processor module 62 retrieves the value corresponding to that name, and converts it to a byte. The byte has the value of "1" if the box is checked and "0" if the box is not checked. Search processor module 62 creates a check box value string by appending these bytes to one another. At step 158 search processor module parses the check box string to locate the next separator character ("|"). If, at step 160, another separator is found, search processor module 62 returns to step 154 to obtain the next check box value and append it to the check box value string. When the last check box value has been obtained, search processor 62 appends the "awk" logical-AND symbol ("&&") to the script file at step 161 and appends the check box value string and the check box field number to the script file at step 162. The complete "awk" script has the format:

$1 ~ /<pattern>/&&$3/<pattern>/&&$2/<pattern>/

&&$4/<pattern>/ . . . /&&$N/<checkbox_value_string>/

At step 163 search processor module 62 begins constructing the "awk" command line that is to execute the "awk" script. For purposes of clarity, this process is described below in terms of the functional steps it comprises, and thus does not consider that, in the code listing in the Appendix, certain steps are performed within sub-functions that are called from within other functions. The resulting command line described below is nonetheless functionally equivalent to that which the code listed in the Appendix would create. Search processor module 62 begins by writing the "nawk" command itself, specifying that the field separator is the pipe character ("|"), followed by the name of the "awk" script file.

At step 164 search processor module 62 determines the value of the "Limit to" option box 90. Search processor module 62 appends to the command line a pipe character ("|") and a "head" command with this value as its argument. As those of skill in the art will understand, the "head" command passes only the number of lines specified in its argument. For example, if a user specified a value of "25" in the "Limit to" option box 90, the command line at this stage in its construction would appear as:

*nawk-F'|'-f<scriptfile>|head-25*

At step 165 search processor module 62 determines the field number that corresponds to the value the user selected in the "Sort by" option box 84 (FIG. 5). Search processor module 62 can determine the field number by searching the field tag string. For example, if a user elects to sort by "Topic", processor 62 would determine that the field number is two. Search processor module 62 appends a pipe character "|" and a "sort" command to the command line. As those of skill in the art will understand, the "sort" command can be used to sort data by a specified parameter.

Search processor module 62 then appends the name of the file from which the "awk" script will obtain its input and the name of the file to which the "awk" script will write its output. At step 167, processor module 62 determines if the user checked box 88 on search form 77 (FIG. 5) to indicate that the search should be case-sensitive or case-insensitive. If the search should be case-sensitive, at step 169 search processor module 62 appends the filename of the "awk" script to be executed, the name of the merchant's item file ("itmfil.asc" in the code listing in the Appendix) and the name of the output file ("itmfil.tmp" in the code listing in the Appendix), separating the input and output files by the redirection character (">"). If the search should be case-insensitive, at step 171 search processor 62 appends the filename of copy of the "awk" script in which any lowercase text has been converted to uppercase, the name of a copy of the merchant's item file in which any lowercase text has been converted to uppercase, and the name of the output file, separating the input and output files by the redirection character (">"). The format of the resulting command line is:

nawk − F'|' − f <scriptfile> | head-n | sort-t"|" + <field_num>

<input_file> > <output_file>

At step 173 search processor module 62 executes this command line. As discussed above, search processor module 62 expects the merchant's item file to be an ASCII file. Most ASCII database files will either have fields that are separated by a known, predetermined character or will have fields that are a fixed length. The above command line, however, expects fields to be separated by a pipe character ("|") and records to be separated by a new line. If the database uses a separator character other than pipe character ("|"), a simple conversion program (not shown) can be used to replace the separator character in the database with the separator character "|". Similarly, if the database fields are of a fixed length and not separated by a unique character, a simple program (not shown) can be used to insert the separator character "|" between fields. In addition, because the check box field is not a common feature of ASCII databases, a simple program (not shown) may be created for inserting a check box field.

As those of skill in the art will recognize, the result or outcome of the "awk" script is a boolean value that is the logical-AND of the results of all of the comparisons of the specified search parameters with the contents of the specified field in the item file. Because the "awk" program does not specify any action to take if the results of the comparison are positive, by default the only result is that the "awk" script copies from the item file to the temporary item file those lines (records) that returned a positive result.

Figure 9B:
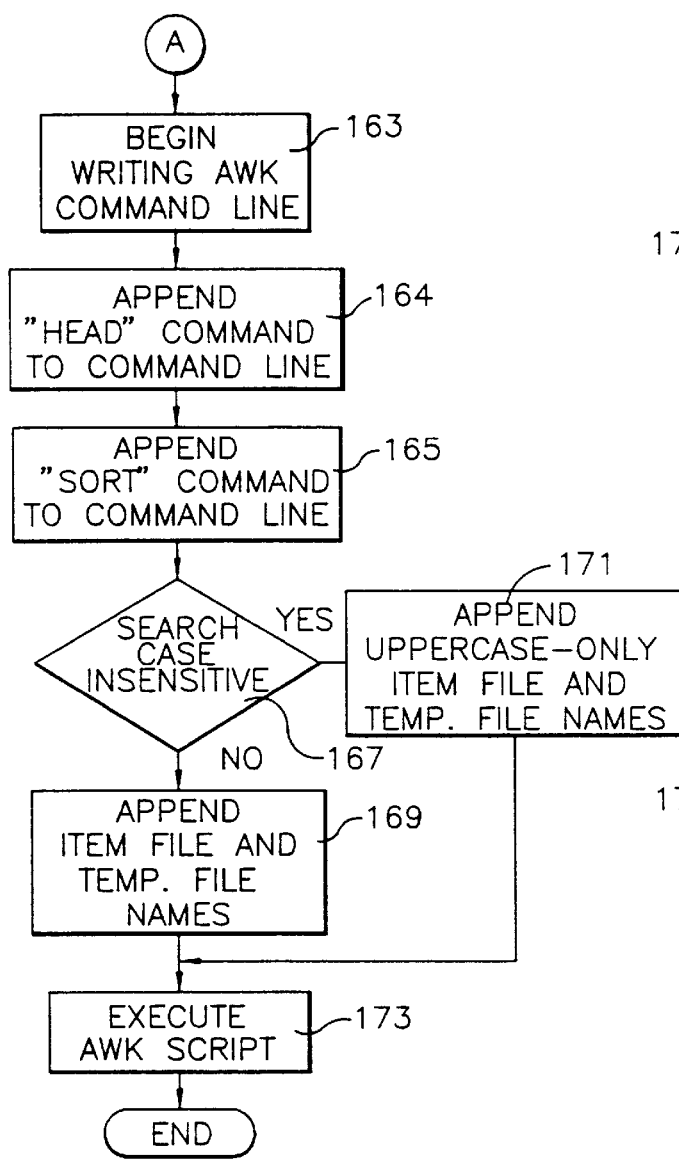
Figure 10:
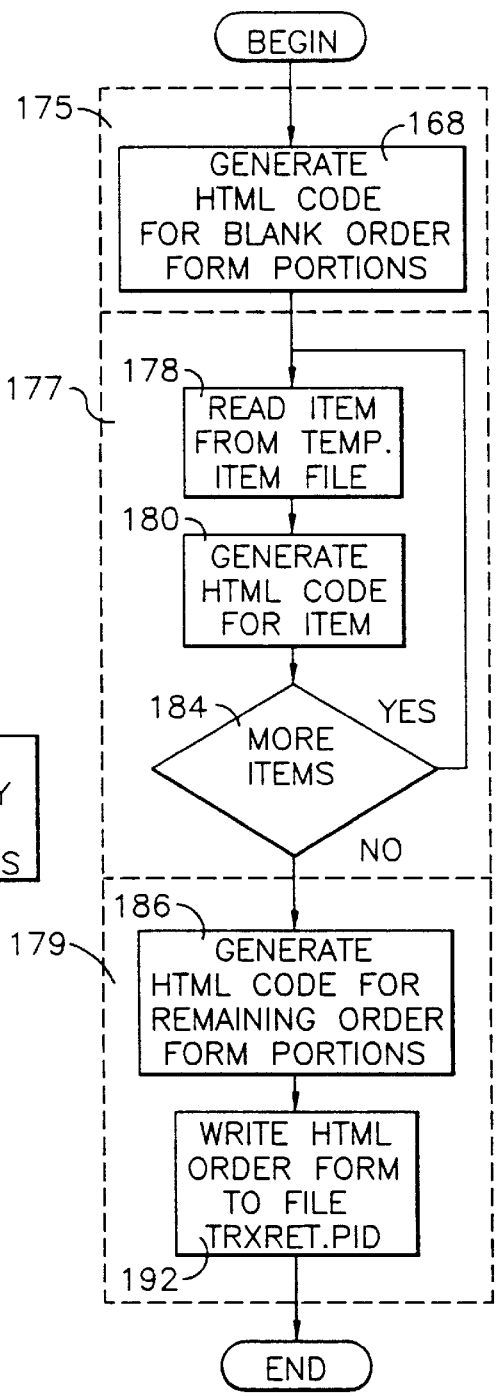
FIG. 10 is a flow diagram of an order form generator sub-module of "proc_srch"

FIG. 9B illustrates the process by which search processor 62 uses the search results stored in the temporary item file to produce the HTML order form, such as the exemplary order form 166 shown in FIG. 10. Search processor 62 constructs order form 166 by writing the HTML code it generates to the file having the format "ordfrm.<trxno >" in the merchant's directory. As noted above, this file is specified in the hidden variables received with search form 77. In the above example, the filename is "ordfrm.4000". With respect to the exemplary code listing in the Appendix, the process is performed by three sub-modules 175, 177 and 179 of "proc_srch", named "gen_top", "gen_dtl" and "gen_bot", respectively. Nevertheless, the division of the software into modules and sub-modules is largely a matter of design choice that those of skill in the art may address in any suitable manner.

At step 168 search processor 62 generates HTML code representing certain portions of order form that are not dependent on the search results. For example, it may generate the merchant's logo 170. It may also generate a "Open an account" hyperlink 172 that points to account generator 53. If the user does not already have an account with the electronic mall operator, the user may click on "Open an account" hyperlink 172 to open one, as described in further detail below. If the user has an account, the user may enter an account number and password in an "Account#" text input box 174 and a "Password" text input box 176 that search processor 62 generates. Search processor 62 also creates column headings on the order form by generating HTML code corresponding to a text string stored in the merchant parameter file. Search processor 62 also generates hidden variables, one of which is the "func" variable, described above with respect to search form 77. The "func" variable is assigned a value of "ordent" because order form 166 is to be routed to running order form processor 64.

Returning to FIG. 9B, at step 178 search processor 62 reads a record from the temporary item file. At step 180 search processor 62 strips the field separator characters and generates HTML code representing all fields in the record. Search processor 62 precedes this HTML code with additional HTML code for producing a numeric value input box 182 (FIG. 10) in which the user can indicate the quantity of that item the user wishes to order.

The HTML code that search processor 62 generates in association with each item in the temporary item file also includes a hidden variable "KEY" having a value that uniquely identifies the item. As described below, this value and the corresponding quantity that the user enters into numeric value input box 182 will be transmitted to order processor 64. The merchant parameter file includes a statement that specifies one or two field numbers. If a single field number is specified, search processor 62 uses the value stored in that field of the merchant's item file as the value of "KEY". If two field numbers are specified, search processor 62 uses the concatenation of the values stored in those fields of the merchant's item file as the value of "KEY". Thus, in the book merchant example above, the merchant parameter file may specify field one as the key field because the Item Number of a book uniquely identifies it.

The HTML code that search processor 62 generates in association with each item in the temporary item file may include a hyperlink. The search form may thus allow a user to view images of the items or obtain further information about an item or its manufacturer by clicking on hot-spots (not shown). The merchant parameter file may include statements that specify associated image files, HTML files, or URLs. If an associated object is an image file or HTML file, search processor 62 generates HTML code representing a hyperlink to it. If an associated object is a URL, search processor 62 generates HTML code representing a hyperlink having that URL.

At step 184, if all the records in the temporary item file have been read, search processor 62 proceeds to step 186. If all records have not been read, search processor 62 returns to step 178.

At step 186 search processor module 62 generates additional HTML code representing the remaining portions of order form 166. It may generate a "Search for other items" hyperlink 188 that points to search generator 54 (FIG. 3). The user may click on hyperlink 188 to initiate a new search. Search processor 62 may also generate a "Add these to order" submit button 190.

At step 192, search processor module 62 writes order form 166 (filename "ordfrm.<trxno>") to file "TRXRET-.PID". As described above with respect to FIG. 2 and search form 77, return pipe module 58 causes order form 166 to be transmitted to browser 24 for viewing by the user on monitor 28 (FIG. 1).

Referring to FIG. 3, the user enters client-provided order selection information 194 and clicks on order submit button 190 to submit order form 166. Client order selection input includes the quantity of each item ordered, if any, and the user's account number and password.

As described above, output pipe module 56 receives all forms that are submitted and routes them to the proper one of processor modules 59–66 in response to the hidden variable "func". If the hidden variable "func" has a value of "ordent", output pipe module 56 routes the form to running order processor module 64.

4. Maintaining a Running Order

Figure 11:
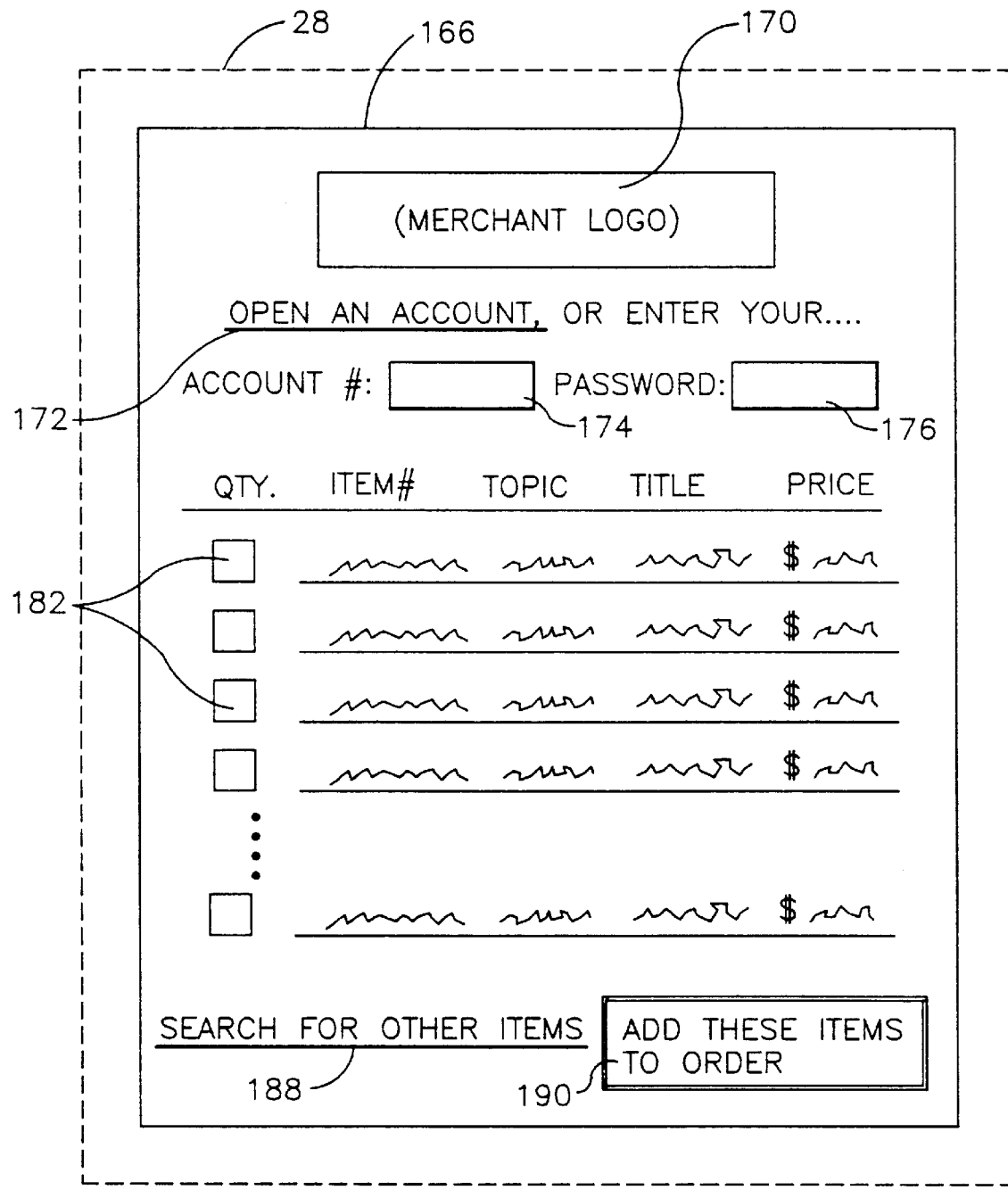
FIG. 11 illustrates a typical order form.

FIG. 11 illustrates the process by which running order processor module 64 receives the selected items and adds them to the running order. A UNIX shell script listing of running order processor module 64 (filename "proc_ordr") is provided in the Appendix.) At step 196 running order processor module 64 reads the account number and password from file "TRXOUT.PID". These values are those that the user entered as part of client-provided order selection information 194 (FIG. 3), as described above. At step 198 running order processor module 64 determines whether the user entered both an account number and a password, as required. If one or both of these values are missing, running order processor module 64 proceeds to step 200 and generates HTML code representing an error message form 202 (FIG. 3) to file "TRXRET.PID". As described above with respect to FIG. 2, return pipe module 58 causes error message form 202 to be transmitted to browser 24 for viewing by the user. Error message form 202 comprises a simple message, such as "The account number and/or password you entered are incorrect. If you do not have an account, please click here." As indicated in FIG. 3, the word "here" is a hot-spot indicating an account hyperlink 204 that references customer processor module 60. If the user receives error message form 202, the user may click on this hot-spot (client error recovery input 206) to open an account. If the user has an account but inadvertently failed to enter an account number or password, the user may use the "Back" button (not shown) that browser 24 provides to return to the previously displayed document, which in this instance would be order form 166. The user may then re-enter the proper account number and password.

When the user has entered an account number and password, running order processor module 64 proceeds to step 208. At step 208 running order processor module 64 searches the ASCII customer file, which is included in running order processor data filed 209 (FIG. 3), for the account number the user entered. If, at step 210, running order processor module 64 determines that the account number does not exist in the customer file, running order processor module 64 proceeds to step 200 and generates the HTML error message form 202 described above. If running order processor module 64 confirms that the user has entered a valid account number, at step 212 it compares the password the user entered to the password listed in the customer file that corresponds to that account number. If the passwords do not match running order processor module 64 proceeds to step 200 and generates the HTML error message form described above. If the passwords match, running order processor module 64 reads from file "TRXOUT.PID" the name and value pairs that specify the products and ordered quantities that the user entered as part of client-provided order selection information 194 (FIG. 3). At step 216 running order processor module 64 extends the prices by multiplying the price by the ordered quantity of an item. At step 218 running order processor module 64 updates the running order file that is included in running order process data files 209. At step 220 running order processor module 64 generates HTML code representing a listing the names, quantities and prices of all items ordered. At step 22 running order processor 64 writes the resulting order summary form 222 (FIG. 3) to file "TRXRET.PID". As described above with respect to FIG. 2, return pipe module 58 causes order summary form 22 to be transmitted to browser 24 (FIG. 1) for viewing by the user.

Referring to FIG. 3, the user enters client-provided order confirmation information 224. Client-provided order confirmation information 224 comprises three order options: clicking on "Clear Order" submit button 226; clicking "Add to Order" submit button 228; and clicking on "Pay Out" submit button 230.

As described above, output pipe module 56 receives all forms that are submitted and routes them to the proper one of processor modules 59–66 in response to the hidden variable "func". If the hidden variable "func" has a value of "ordacc", output pipe module 56 routes the form to total order processor module 66.

5. Totalling an Order

Figure 12:
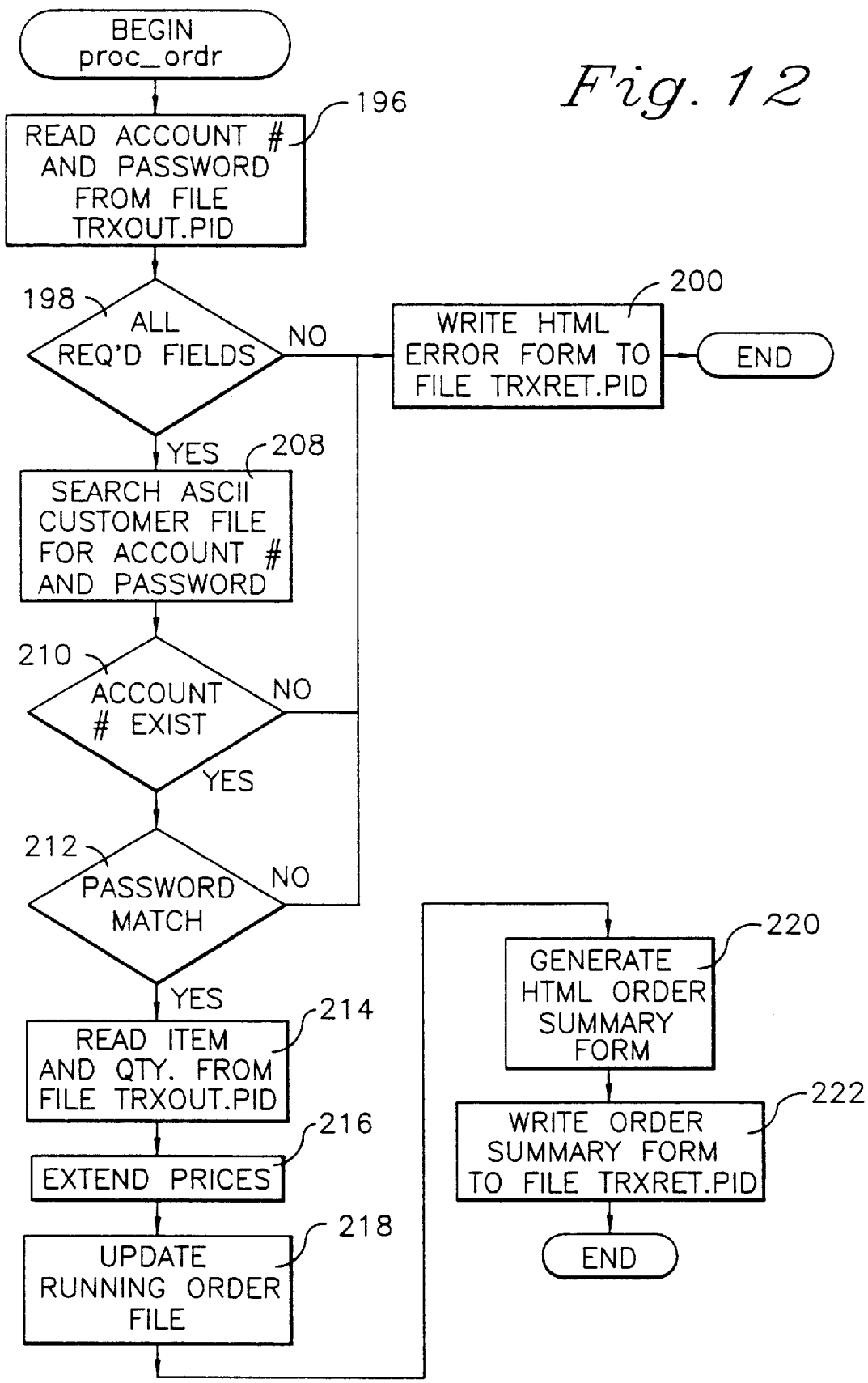
FIG. 12 is a flow diagram of the running order processing software module "proc_ordr"

FIG. 12 illustrates the process by which total order processor module 66 handles the user's selected order option. A UNIX shell script listing of total order processor module 66 (filename "proc ordt") is provided in the Appendix.) At step 232 total order processor module 64 reads the value associated with the submitted form to determine which of submit buttons 226, 228 and 230 was clicked on. If, at step 234, total order processor module 66 determines that "Add to Order" submit button 228 was clicked on, total order processor module 64 transfers execution to search generator module 54 at step 236. If, at step 238, total order processor module 66 determines that "Clear Order" submit button 226 was clicked on, total order processor module 66 clears the running order file at step 240 and then transfers execution to search generator module 54 at step 236.

If neither of submits buttons 228 or 226 were clicked, total order processor module 66 proceeds to step 242 because "Pay Out" submit button 230 must have been clicked. At step 242 total order processor module 66 generates HTML code representing a payout form 244 (FIG. 3). Total order processor module 66 retrieves the information it needs to include in payout form 244 from the parameter file and running order file, which are included in total order processor data files 246. Payout form 244 includes suitable input boxes (not shown) for entering credit card information or other payment information, such as an Internet banking agency account number. The parameter file includes information that specifies the payment methods accepted by that merchant and the input boxes and other HTML features that allow the user to choose among those methods. Payout form 244 also includes a "Pay" submit button 250. At step 252 total order processor 66 writes payout form 244 to file "TRXRET.PID". As described above with respect to FIG. 2, return pipe module 58 causes payout form 244 to be transmitted to browser 24 (FIG. 1) for viewing by the user.

Referring to FIG. 3, the user enters client-provided payment information 248 by typing the credit card or other payment information into the input boxes and clicking on "Pay" submit button 250.

As described above, output pipe module 56 receives all forms that are submitted and routes them to the proper one of processor modules 59–66 in response to the hidden variable "func". If the hidden variable "func" has a value of "cashtrx", output pipe module 56 routes the form to the order completion processor module 59.

6. Completing an Order

Figure 13:
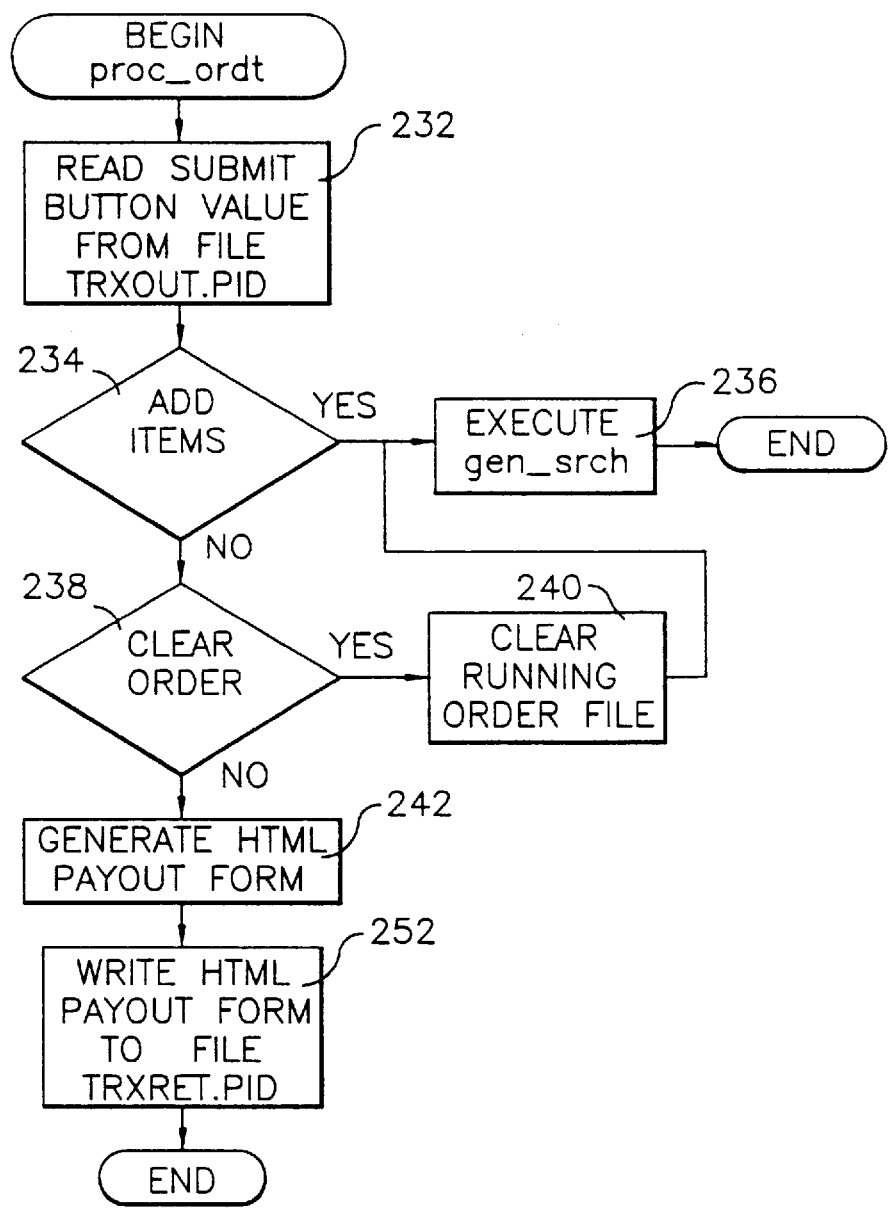
FIG. 13 is a flow diagram of the total order processing software module "proc_ordt"

FIG. 13 illustrates the process by which order completion processor module 59 records the user's order. A UNIX shell script listing of order completion processor module 59 (filename "proc_ordc") is provided in the Appendix.) At step 256 order completion processor module 59 reads the payment information from file "TRXOUT.PID". At step 258 order completion processor module 59 generates an order number. The order number is preferably the current value of a counter that order completion processor module 59 increments each time it is entered. Order completion processor module 59 reads this value and stores it in an order number file along with the payment information and the customer's name, address and other pertinent identifying information, which order completion processor module 59 obtains from the customer file. The order number file and customer file are included in order completion processor data files 259. At step 260 order completion processor module 59 generates HTML code representing an order confirmation form 262 (FIG. 3). Referring briefly to FIG. 3, order confirmation form 262 preferably includes a message (not shown), such as "Thank you for your order." Order confirmation form 262 also preferably includes a hyperlink 263 pointing to a suitable resource on the web, such as home page 69.

Returning to FIG. 13, at step 264 order completion processor module 59 writes order confirmation form 262 to file "TRXOUT.PID". As described above with respect to FIG. 2, return pipe module 58 causes order confirmation form 262 to be transmitted to browser 24 (FIG. 1) for viewing by the user.

A merchant or other authorized party may periodically, e.g., hourly or daily, retrieve the order number file in the merchant's directory. The file contains all information necessary for the merchant to receive payment and ship the items that the user ordered.

7. Opening a New Account

Figure 14:
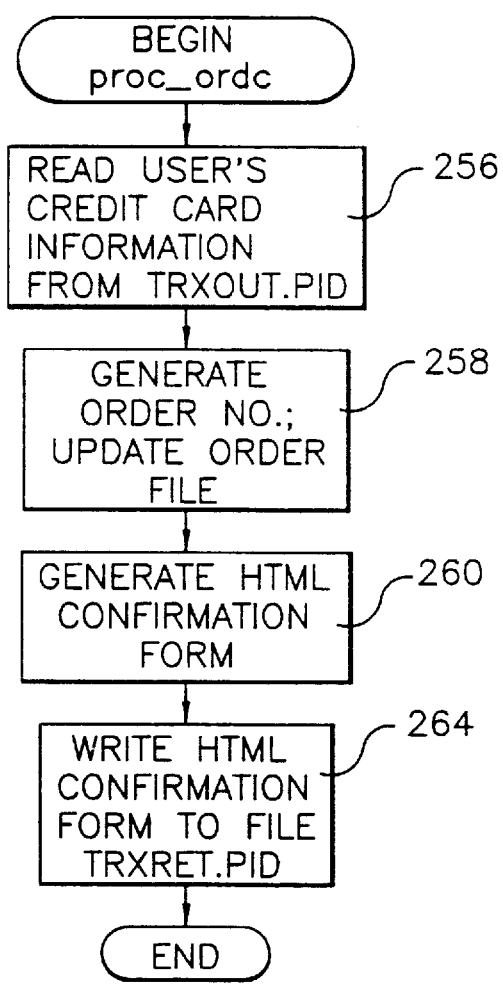
FIG. 14 is a flow diagram of the order completion processing software module "proc_ordc"

As described above, a user may click on hyperlink 172 or 204 in order form 166 and order error message 202 (FIG. 3), respectively, to open an account with the mall operator. Hyperlinks 172 and 204 point to account generator 53. FIG. 14 illustrates the process by which account generator 53 generates a form into which a user can enter information required to open an account. A UNIX shell script listing of account generator 53 (filename "gen-acct") is provided in the Appendix.) At step 266 account generator 53 generates HTML code representing a new account form 268 (FIG. 3). New account form 268 includes text boxes (not shown) into which a user may enter a name, address, e-mail address, an account number (i.e., a user name), password and other pertinent customer information. Account form generator obtains the information it needs to include in new account form 268 from the parameter file and running order file, which are included in new account data files 270. New account form 268 also includes an "Open Account" submit button 271. At step 272 new account generator 53 writes new account form 268 to file "TRXRET.PID". As described above with respect to FIG. 2, return pipe module 58 causes order confirmation form 262 to be transmitted to browser 24 (FIG. 1) for viewing by the user.

Referring to FIG. 3, the user may enter the requested client-provided customer information 276 into the text boxes and then submit new account form 268 by clicking on "Open Account" submit button 271.

As described above, output pipe module 56 receives all forms that are submitted and routes them to the proper one of processor modules 59–66 in response to the hidden variable "func". If the hidden variable "func" has a value of "newcust", output pipe module 56 routes the form to customer processor module 60.

Figure 15:
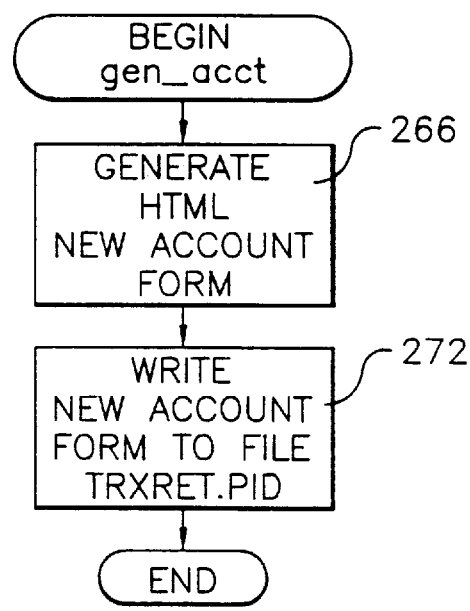
FIG. 15 is a flow diagram of the new account form generator software module "gen-acct"

FIG. 15 illustrates the process by which customer process module 60 opens a new account. A UNIX shell script listing of customer processor module 60 (filename "proc_cust") is provided in the Appendix.) At step 278 customer processor module 60 reads client-provided customer information 276 from file "TRXOUT.PID". At step 280 customer processor module 60 determines whether the user failed to fill in certain text boxes (not shown) in new account form 268 with required information, such as a name and address. If the user did not complete new account form 268, at step 282 customer processor module 60 generates HTML code representing an error message, such as: "We cannot set up an account unless you provide all information requested." Customer processor module 60 writes this HTML document to file "TRXRET.PID". As described above, this document is routed to client computer 12 for the user to view. The document may have a hyperlink (not shown) that references new account form 268. By clicking on the hyperlink, the user can return to new account form 268 and provide the missing information. Alternatively, the user can click on the "Back" button provided by browser 24 to return to new account form 268.

If, at step 280, customer processor module 60 determines that the user provided all necessary information, customer processor module 60 proceeds to step 284. At step 284 customer processor module 60 determines whether the user entered text into the "account number" text input box (not shown) on new account form 268. The account number may be any alphanumeric text string. If the user did not enter an account number, customer processor module 60 generates one for the user at step 286. Customer processor module 60 may generate this account number by incrementing a counter stored in the parameter file, which is included in customer processor data files 288 (FIG. 3). If the user entered an account number, customer processor module 60 determines whether it is available, i.e., whether another user has already selected it. At step 286 customer processor module 60 searches the ASCII customer file, which is included in customer processor data files 288. If, at step 288, customer processor module 60 determines that the requested account number already exists in the customer file, customer processor module 60 generates HTML code representing an error message at step 290, such as: "The account number you requested is already in use. Please select another account number." Customer processor module 60 writes this HTML document to file "TRXRET.PID". As described above, this document is routed to routed to client computer 12 for the user to view. The document may have a hyperlink (not shown) that references new account form 268. By clicking on the hyperlink, the user can return to new account form 268 and provide a new account number. Alternatively, the user can click on the "Back" button provided by browser 24 to return to new account form 268.

If the requested account number is available, at step 292 customer processor module 60 locks the customer file using the UNIX link command "In -s<customer_ filename><dummy_filename>". Linking the customer file to any other file, in effect locks it against concurrent use by two processes because if another process subsequently attempts to link the customer file, that process will receive an error indication. Thus, if customer processor module 60 detects an error condition at step 294, it waits a predetermined time period at step 296 and returns to step 292 to re-attempt linking the customer file. If no error condition exists, customer processor module 60 appends a new customer record to the customer file at step 298.

At step 300 customer processor module 60 unlocks the customer file by unlinking it. At step 302 customer processor module 60 writes order form 166 (FIG. 3) to file "TRXRET.PID". If customer processor module 60 generated an account number at step 286, it first places the account number in the "account number" text input box on order form 166. As described above, order form 166 is thus routed to client computer 12 for the user to view. Referring to FIG. 3, the user may then re-submit order form 166.

8. Operation

Referring to FIG. 3, operation of the electronic merchandising system may be summarized as follows: The user selects a merchant whose products or services are available. The user may make this selection by typing a URL or by clicking on a hyperlink anywhere in the web. In response, search generator 54 generates search form 77. The user fills in search form 77 with information relating to products or services of the merchant in which the user is interested and submits search form 77. In response to submission of search form 77, search processor 62 searches the merchant's item file for items that meet the search parameters the user entered. Search processor 62 generates order form 166, which lists these items. The user enters, in addition to his username and password, the quantity of each item desired and submits order form 166. If the user does not have an account, the user may open an account before submitting order form. Account form generator 53 then generates new account form 268. The user fills in new account form 268 with personal information and submits it. In response to submission of new account form 268, customer processor module 60 sets up a new account for the user and returns to order form 166. In response to submission of order form 166, running order processor 64 maintains a list of items that the user indicated a desire to purchase and generates order summary form 222 that provides this list as well as offers the user the options of clearing the running order, searching for more items, or paying for the order. Selecting one of these options submits order summary form 22. If the user chose to clear the order or search form more items, search generator 54 generates another search form 77. If the user chose to pay for the order, total order processor 66 calculates the total cost of the items and generates payout form 244. The user fills in payout form 244 with payment information, such as a credit card number, and submits it. In response to submission of order payout form 244, order completion processor module 59 generates order confirmation form 262.

It should be noted that the processing flow or sequence described above is only exemplary and is intended to represent a typical sequence of transactions. As those of skill in the art will appreciate, in a client-server system such as that described herein, the transaction sequence is controlled largely by the user. The user can type a URL or use the "Back" button provided by the browser to change the sequence. Moreover, a user can access a module from outside the system via a hyperlink on another document, such one generated by an individual merchant's web server that may be physically remote from web server 10.

Furthermore, those of skill in the art will understand that, although in the embodiment described above the information needed to dynamically generate the various forms is stored in the electronic mall operator's web server 10, this information can be stored in a web server that is physically remote from the electronic mall operator's web server 10, such as an individual merchant's web server (not shown). A merchant may therefore merely specify to the electronic mall operator the URLs that point to the resources needed to generate the forms.

B. Common Gateway Interface

Figure 16:
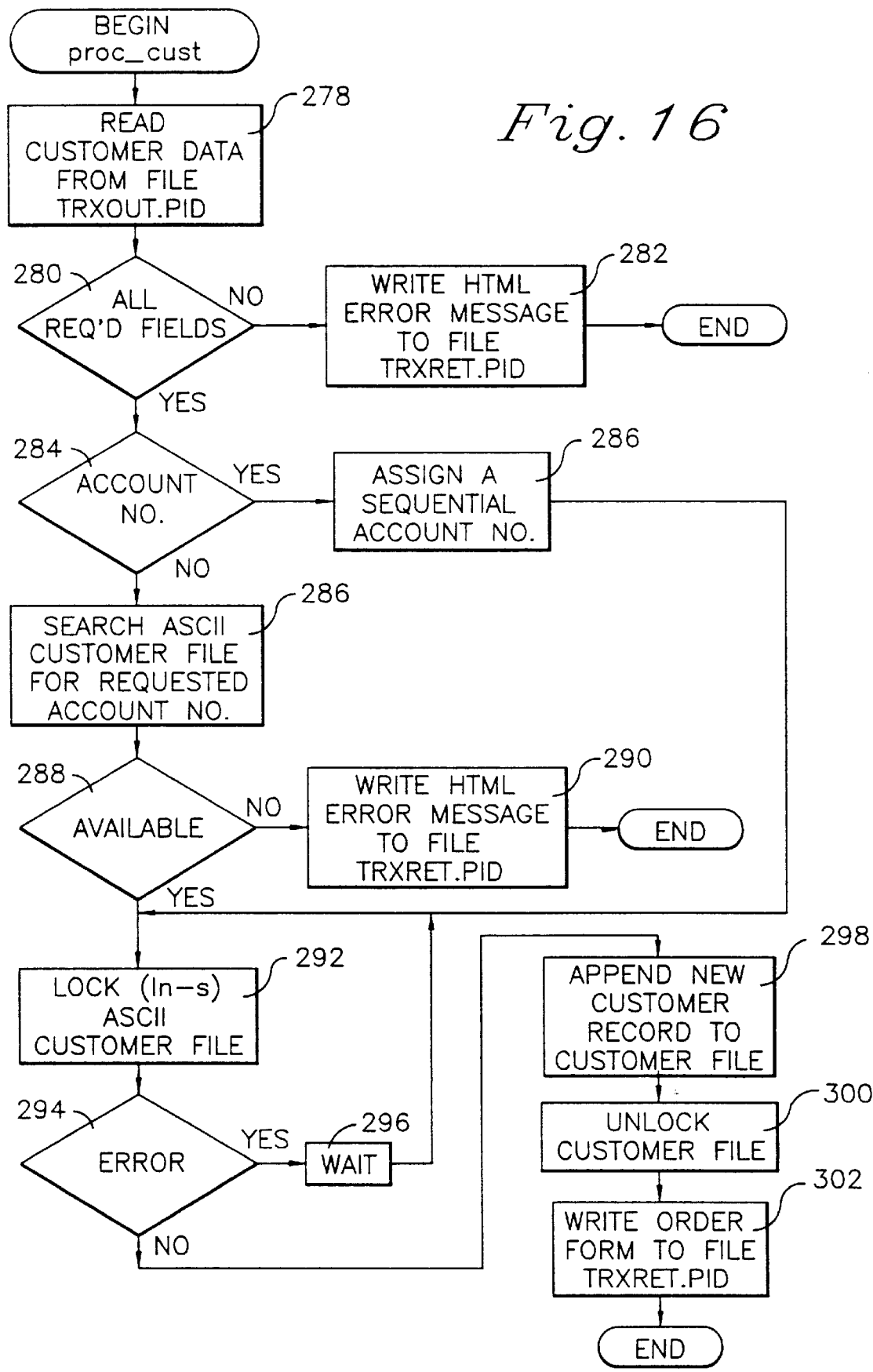
FIG. 16 is a flow diagram of the customer processing software module "proc_cust"

The above-described gateway by which forms are routed via CGI 46 and pipe modules 56 and 58 may be used to route forms among multiple application program systems using the novel linking method described below. As illustrated in FIG. 16, CGI 46 may be the gateway to other application program systems 304 and 306 alternatively or in addition to the electronic merchandising system 54 described above.

Each application program system includes a pipe module similar to pipe modules 56 and 58. These pipe modules have unique filenames. For example, the input and output pipe modules of application program system 304 may have filenames "pf_out1" and "pf_ret1", respectively, and the input and output pipe modules of application program system 306 may have filenames "pf_out2" and "pf_ret2", respectively, thereby distinguishing them from input and output pipe modules 56 and 58 (filenames "pf_out" and "pf_ret", respectively, in the code listing in the Appendix) of electronic merchandising system 54. The other application program systems 304 and 306 use their respective pipe modules as an interface with CGI 46 in the same manner described above by which electronic merchandising system 54 uses pipe modules 56 and 58.

Although only a single copy of CGI 46 physically resides on disk 36 (FIG. 1), CGI 46 can be referenced by more than one filename by linking multiple filenames using the UNIX link command "ln -f". For example, CGI 46, which can be referenced by the filename "post_form", can be linked to filenames "post_form1", "post_form2", "post_form3", and so forth.

A remote user may specify in a URL the application program system to access by specifying CGI 46 using one of its aliases. For example, if HTTPD 44 receives a request for "post_form1", CGI 46 will open an input pipe to "pf1_out" and a return pipe to "pf1_ret". CGI 46 performs this function by obtaining its own filename using the "ARGV [0]" command and then constructing the filename of the return pipe module. For example, if CGI 46 determines that was called using filename "post_form 1", it strips the last character, "1", appends it to the text string "pf", and then appends the text string "_out" to the result to form the text string "pf1_out". Pipe modules "pf1_out" and "pf1_ret" then interface with application program system 304 in the same manner as described above with respect to pipe modules 56 and 58.

As those of skill in the art will appreciate in view of the "post_form" code listing in the Appendix, CGI 46 may be very compact and efficient because it performs essentially no data manipulation. CGI 46 determines the application program to access by determining its own filename. It then sends the incoming data to the proper pipe module and receives the outgoing data from the proper pipe module, the data passing through CGI 46 essentially unchanged. Modifying or revising an application program does not affect CGI 46.

Obviously, other embodiments and modifications of the present invention will occur readily to those of ordinary skill in the art in view of these teachings. Therefore, this invention is to be limited only by the following claims, which include all such other embodiments and modifications when viewed in conjunction with the above specification and accompanying drawings.

What is claimed is:

1. A programmed web server computer having a search engine, comprising:

search form generating means for reading a file having a correspondence between fields of an ASCII text file and field labels, for reading a parameter file defining said correspondence, and for outputting HTML code representing graphical input structures, each graphical input structure corresponding to a searchable field of said database and including a corresponding one of said field labels extracted from said parameter file;

receiving means in said search engine for receiving one or more search parameters from a client computer, each search parameter representing information obtained from one of said graphical input structures; and searching means in said search engine for sequentially searching said ASCII text file in response to said search parameters.

2. The programmed web server computer recited in claim 1, wherein said search engine is a UNIX shell script.

3. The programmed web server computer recited in claim 1, wherein:

said receiving means receives a field tag associated with each search parameter; and said searching means reads said parameter file to determine said correspondence and searches each field of said ASCII text file corresponding to one of said field tags in response to said search parameters associated with said one of said field tags.

4. The programmed web server computer recited in claim 1, wherein:

said receiving means receives a record limit from said client computer; and said searching means returns a number of records not greater than said record limit.

5. The programmed web server computer recited in claim 1, wherein:

said receiving means receives a case sensitivity selector from said client computer; and said searching means searches both uppercase and lowercase search parameters when said case sensitivity selector is in a first state, and searches only uppercase search parameters when said case sensitivity selector is in a second state.

6. The programmed web server computer recited in claim 1, wherein said searching means comprises:

means in said search engine for transforming said search parameters into an "awk" search script; and means in said search engine for initiating execution of said "awk" search script to effect a search.

7. The programmed web server computer recited in claim 1, wherein:

said receiving means receives information from said client computer;

said programmed web server further comprises entry means for storing said information in an ASCII text file; and said entry means comprises locking means for locking said ASCII text file against concurrent access by other processes.

8. The programmed web server computer recited in claim 7, wherein said locking means comprises means for linking said ASCII file using a UNIX symbolic link command.

9. The programmed web server computer recited in claim 1, wherein said HTML code represents an electronic merchandising order form, and said portions of said ASCII text file represent items available for ordering.

10. A programmed web server computer having a search engine, comprising:

receiving means in said search engine for receiving one or more search parameters from a client computer;

searching means in said search engine for sequentially searching an ASCII text file in response to said search parameters;

HTML output form generating means in said search engine for outputting HTML code corresponding to portions of said ASCII text file matching said search parameters; and wherein said search engine is a UNIX shell script.

11. The programmed web server computer recited in claim 10, wherein:

said receiving means receives a field tag associated with each search parameter, said field tag being a label for a database field; and said searching means searches each field of said ASCII text file corresponding to one of said field tags in response to said search parameters associated with said one of said field tags.

12. The programmed web server computer recited in claim 7, wherein:

said receiving means receives a record limit from said client computer; and said searching means returns a number of records not greater than said record limit.

13. The programmed web server computer recited in claim 10, wherein:

said receiving means receives a case sensitivity selector from said client computer; and said searching means searches both uppercase and lowercase search parameters when said case sensitivity selector is in a first state, and searches only uppercase search parameters when said case sensitivity selector is in a second state.

14. The programmed web server computer recited in claim 10, wherein said searching means comprises:

means in said search engine for transforming said search parameters into an "awk" search script; and means in said search engine for initiating execution of said "awk" search script to effect a search.

15. The programmed web server computer recited in claim 10, wherein:

said receiving means receives information from said client computer;

said programmed web server further comprises entry means for storing said information in an ASCII text file; and said entry means comprises locking means for locking said ASCII text file against concurrent access by other processes.

16. The programmed web server computer recited in claim 15, wherein said locking means comprises means for linking said ASCII file using a UNIX symbolic link command.

17. The programmed web server computer recited in claim 10, wherein said HTML code represents an electronic merchandising order form, and said portions of said ASCII text file represent items available for ordering.

18. A searching method performed on a web server computer having a search engine, comprising the steps of:

receiving one or more search parameters from a client computer;

sequentially searching an ASCII text file in response to said search parameters;

outputting HTML code corresponding to portions of said ASCII text file matching said search parameters; and wherein said web server performs said method by executing a UNIX shell script.

19. The searching method recited in claim 18, wherein:

said receiving step comprises the step of receiving a field tag associated with each search parameter, said field tag being a label for a database field; and said searching step comprises the step of searching each field of said ASCII text file corresponding to one of said field tags in response to said search parameters associated with said one of said field tags.

20. The search method recited in claim 18, wherein:

said receiving step comprises the step of receiving a record limit from said client computer; and said searching step comprises the step of returning a number of records not greater than said record limit.

21. The search method recited in claim 18, wherein:

said receiving step comprises the step of receiving a case sensitivity selector from said client computer; and said searching step comprises the step of searching both uppercase and lowercase search parameters when said case sensitivity selector is in a first state, and searches only uppercase search parameters when said case sensitivity selector is in a second state.

22. The search method recited in claim 18, wherein said searching step comprises the steps of:

said search engine transforming said search parameters into a UNIX "awk" search script; and said search engine initiating execution of said UNIX "awk" search script to effect a search.

23. The programmed web server computer recited in claim 18, wherein said searching step comprises the step of locking said ASCII text file against concurrent access by other processes.

24. The search method recited in claim 23, wherein said locking step comprises the step of linking said ASCII file using a UNIX symbolic link command.

25. The search method recited in claim 18, wherein said HTML code represents an electronic merchandising order form, and said portions of said ASCII text file represent items available for ordering.

26. A programmed web server computer having a search engine, comprising:

search form generating means for reading a file having a correspondence between fields of an ASCII text file and field labels and for outputting HTML code representing graphical input structures of an electronic merchandising order form, each graphical input structure corresponding to a searchable field of said database and including one of said field labels, portions of said ASCII text file representing items available for ordering;

receiving means in said search engine for receiving one or more search parameters from a client computer, each search parameter representing information obtained from one of said graphical input structures, said receiving means receiving a case sensitivity selector from said client computer, and said receiving means receiving a record limit from said client computer; and searching means in said search engine for sequentially searching said ASCII text file in response to said search parameters, said searching means comprising means for writing an "awk" search script and means for initiating execution of said "awk" search script, said searching means searching both uppercase and lowercase search parameters when said case sensitivity selector is in a first state, and searching only uppercase search parameters when said case sensitivity selector is in a second state, and said searching means returning a number of records not greater than said record limit.

27. A computer-readable storage medium on which is recorded a search engine for searching a database in response to a search form generated by a search form generating means, said search form generating means reading a file having a correspondence between fields of an ASCII text file and field labels and outputting HTML code representing graphical input structures of an electronic merchandising order form, each graphical input structure corresponding to a searchable field of said database and including one of said field labels, portions of said ASCII text file representing items available for ordering, said search engine comprising:

receiving means for receiving one or more search parameters from a client computer, each search parameter representing information obtained from one of said graphical input structures, said receiving means receiving a case sensitivity selector from said client computer, and said receiving means receiving a record limit from said client computer; and searching means for sequentially searching said ASCII text file in response to said search parameters, said searching means comprising means for writing an "awk" search script and means for initiating execution of said "awk" search script, said searching means searching both uppercase and lowercase search parameters when said case sensitivity selector is in a first state, and searching only uppercase search parameters when said case sensitivity selector is in a second state, and said searching means returning a number of records not greater than said record limit.

* * * * *